TRAFFIC SIGNAL OFFSET AND SPLIT CONTROL SYSTEM

Filed Oct. 17, 1963 7 Sheets-Sheet 1

FIG. I

INVENTORS
J.H.AUER JR. AND
J.P.HUFFMAN
BY Forest B. Hitchcock
THEIR ATTORNEY

RATE MODIFIER

COMPARATOR

INVENTORS
J. H. AUER JR. AND
J. P. HUFFMAN
BY Forest B. Hitchcock
THEIR ATTORNEY

PERMISSIVE PERIOD CIRCUITRY

DIVIDE-BY-TWO FLIP-FLOP

RESET SWITCH

*INVENTORS*
J.H. AUER JR. AND
J.P. HUFFMAN

BY Forest B. Hitchcock
THEIR ATTORNEY

TRAFFIC SIGNAL OFFSET AND SPLIT CONTROL SYSTEM

Filed Oct. 17, 1963 7 Sheets-Sheet 4

INVENTORS
J. H. AUER JR. AND
J. P. HUFFMAN
BY Forest B. Hitchcock
THEIR ATTORNEY INVENTORS
J.H. AUER JR. AND
J.P. HUFFMAN
BY Forest B. Hitchcock
THEIR ATTORNEY INVENTORS
J.H. AUER JR. AND
J.P. HUFFMAN
BY [signature]
THEIR ATTORNEY

TRAFFIC SIGNAL OFFSET AND SPLIT CONTROL SYSTEM

United States Patent Office 3,252,134

Patented May 17, 1966

3,252,134

TRAFFIC SIGNAL OFFSET AND SPLIT CONTROL SYSTEM

John H. Auer, Jr., Fairport, and Jerry P. Huffman, Rochester, N.Y., assignors to The General Signal Corporation, Rochester, N.Y., a corporation of New York Filed Oct. 17, 1963, Ser. No. 316,858
16 Claims. (Cl. 340—35)

This invention relates to traffic signal offset and split control systems, and more particularly to means for smoothly changing offset and split at traffic signal local controllers along a section of highway from a section master controller without materially disturbing the existing progression of signals along the highway.

In many instances, efficient traffic flow can be obtained only through integrated control of a plurality of traffic signals located along a traffic artery. This permits employment of a progressive signalling system wherein successive signals along the artery are timed so that vehicles traveling at a predetermined velocity encounter a green signal indication at each successive intersection, after having once encountered a red signal indication along the artery. This requires that the local controllers for each of the succeeding signals be timed to display a green indication to arterial traffic only during a predetermined interval beginning after an interval of proper duration subsequent to start of the arterial green indication for the previously-encountered signal. The latter interval, commonly known as local offset, may be obtained at each local controller by establishing a reference or background zero time for the entire system and requiring the cycle timing means for each of the local controllers to be time-phased with respect to the system timing such that local zero time at any controller bears a predetermined phase relation to system or background zero time, even though the same cycle duration may be demarcated at each controller. This predetermined phase relation is independently selected at each local controller, permitting any predetermined offset to be obtained at any such location.

Changing of the local offsets at the local controllers from one value to another when a new system offset has been established presents a design problem, since it is undesirable to instantaneously shift from the previous local offset to the new local offset. Instantaneous shift in local offset may cause a significant portion of the local cycle to be skipped in the local cycle is required to start later in the background cycle, or may cause a portion of the local cycle to be repeated if the local cycle is required to start earlier in the background cycle. Thus, an amber signal indication or even an entire traffic phase may be skipped or repeated. To avoid this situation, any change in offset at a local controller must be accomplished gradually, over a period of possibly several background cycles if the change is drastic, so that no traffic phase is unduly lengthened or shortened. Hence, such change is accomplished by a temporary but slight increase or decrease in local cycle duration.

Prior systems for making such offset changes have been what may be referred to as "underdamped" systems, since a certain amount of local offset overshoot must be tolerated in order to effectuate the changes smoothly, yet expeditiously. Hence, in attempting to effectuate local offset changes, a balance had to be struck between excessively gradual changes, and more rapid changes involving local offset overcorrection, which then had to be corrected in turn. However, the novel system for making such changes herein disclosed may be referred to as a "critically damped" system, since the changes are made smoothly and expeditiously without any overshoot. Hence, by the use of the instant invention, apparatus for making the local offset changes is deenergized immediately upon reaching the desired new local offset. Moreover, prior systems for making such offset changes included means for comparing the actual and desired local offsets but once per cycle, so that asynchronism between the actual and desired local offsets occurring immediately following this comparison would exist undetected for almost a complete cycle, providing sufficient time for a disruption in smooth traffic flow to occur, unless electromechanical devices were incorporated in the system. The instant invention, without need of electromechanical devices, prevents such condition from occurring, since continuous collation between actual and desired local offsets is made at each local controller, permitting immediate initiation of offset correction whenever asynchronism between actual and desired local offsets occurs.

In an integrated traffic control system, it is desirable to control the time at which cycle split for each local controller occurs, in accordance with traffic conditions. Cycle split may be defined as the relative portions of the local cycle at any local controller which are allocated to the several phases of the associated traffic signal. The control system of the instant invention permits selection of one of a plurality of different cycle splits at each of the various local controllers.

GENERAL DESCRIPTION

The system comprises a traffic signal local controller responsive to a continuous code of discrete electrical pulses transmitted from an arterial section master controller over a suitable communication channel. The pulse repetition rate establishes a time standard for the local controllers situated along the section. Successive background cycles, each of which consists of a suitable number of timing units, such as 100, are demarcated by the last or 50th pulse of each cycle. This pulse, which may be referred to as a sync pulse, establishes a reference or zero background time for the section. At each local controller, a master counter, known as an offset counter, totals the respective pulses. Upon receipt of each 50th, or sync pulse, the counter is reset to a predetermined count.

Each offset counter operates with a preselected phase relationship relative to the sync pulse, thereby establishing local offset for its associated local controller. For example, by matrix selection, the offset counter at one local controller may be required to be at count 40 when the sync pulse occurs. At a subsequent local controller, the associated matrices may be connected to require that the offset counter be, for example, at count 56 when the sync pulse occurs. In such fashion, a predetermined phase relationship between the offset counters at successive local controller locations is established, thereby establishing relative offsets at these locations which are checked once each cycle upon occurrence of the sync pulse. These periodic checks avoid build-up of any error which may occur during a cycle, by preventing carryover of the error into the succeeding cycle. Selection of any one of a plurality of preselected offsets at each local controller can then be made from the section master controller over the communication channel. Occurrence of the sync pulse then resets the offset counter at each local controller to a different count, thereby establishing different relative offsets. Hence, when a new background offset signal is transmitted to the local controllers, a different preselected offset is established at each of the controllers.

An offset counter cannot be used directly for control of traffic signals, since it is subject to an abrupt shift in count whenever a new offset is selected, which could conceivably cause repeating or skipping of a signal phase. In order to avoid such undesirable conditions, the traffic signals are controlled directly from a slave counter, known as a local counter. This counter normally operates in synchronism with the offset counter, except when a change in offset is called for. The counts of both the local and offset counters are continuously collated by means of a comparator and a coincidence detector. If the coincidence detector senses identical counts in each counter, the counters are permitted to continue synchronous operation, each advancing in equal increments in response to received input pulses. However, in event of an offset shift, the offset counter count suddenly is no longer in correspondence with the local counter count. This condition is immediately detected by the coincidence detector, which actuates a rate modifier circuit.

Both the local and offset counters are of a biquinary-decimal type. Hence there are provided in each counter a binary fifties stage for indicating presence or absence of 50 counts, a quinary tens stage for indicating presence of 00, 10, 20, 30 or 40 counts, and a decimal twos stage for indicating presence of 0, 2, 4, 6 or 8 counts. Each fifties stage receives an input count of 50 from the quinary tens stage when the count in the quinary tens stage advances beyond 40, while the quinary tens stage is simultaneously reset to 00. Similarly, each quinary tens stage receives an input count of 10 from the decimal twos stage when the count in the decimal twos stage advances beyond 8, while the decimal twos stage is simultaneously reset to 0.

The rate modifier circuit comprises means for adding pulses to or subtracting pulses from the pulses comprising the cycle rate signal at a predetermined substantially constant pulse repetition rate. Comparator means are provided for determining whether the rate modifier should increase or decrease the number of pulses in the cycle rate signal. The counts in the local and offset counters are continuously compared with each other in the comparator means in order to determine whether the local counter leads or lags the offset counter, and the amount of this lead or lag. In event the local counter leads the offset counter by less than 50 or lags the offset counter by more than 50, a RUN SLOW signal is provided from the comparator means to the rate modifier circuit, causing the rate modifier circuit to remove pulses from the cycle rate signal at the predetermined substantially constant pulse repetition rate. On the other hand, in event the local counter leads the offset counter by more than 50 or lags the offset counter by less than 50, the comparator means provides a RUN FAST signal to the rate modifier circuit, causing the rate modifier circuit to introduce additional pulses into the cycle rate signal at the predetermined substantially constant pulse repetition rate. In this fashion, the local counter is gradually brought into synchronism with the offset counter at a substantially constant rate, beginning immediately at the instant the counters are no longer in synchronism with each other. Moreover, the local counter never has to correct through more than 50% of its capacity. Thus, the change in operation of the traffic signals at each local ccontroller is accomplished smoothly and at a predetermined rate, without any abrupt changes in traffic signal operation.

The rate modifier includes a relaxation oscillator having a fixed pulse repetition rate, a first AND gate responsive a pulse generated by the relaxation oscillator and the pulses comprising the cycle rate signal and producing output pulses when the comparator means requires an increase in the rate at which the local controller operates, switching means adapted to be driven by the relaxation oscillator through a second AND gate when the comparator means provides a signal calling for a decrease in the rate at which the local counter operates, and a two-input AND gate having a first input fulfilled by output signals from the switching means and the second input fulfilled by the cycle rate signal, whereby the output signal provided from the two-input AND gate comprises the cycle rate signal having a pulse removed each time the switching means is triggered by the relaxation oscillator to remove the first input from the two-input AND gate.

The comparator means included in the instant invention commprises first means subtracting the decimal twos digit in the local counter from the decimal twos digit in the offset counter, means coupling a carry digit from the first subtracting means to the local quinary tens counter for increasing the count therein, second means subtracting the local counter quinary tens digit from the offset counter quinary tens digit, a first EXCLUSIVE OR circuit, means coupling a carry digit from the output of the second subtracting means to a first input of the first EXCLUSIVE OR circuit, a second EXCLUSIVE OR circuit receiving a first input from the local counter binary fifties stage and a second input from the offset counter binary fifties stage and providing a second input to the first EXCLUSIVE OR circuit, and phase inverter means coupled to the output of the first EXCLUSIVE OR circuit and responsive to substantially zero output voltage produced therefrom for providing a RUN FAST signal to the rate modifier, the first EXCLUSIVE OR circuit also providing a RUN SLOW signal to the rate modifier circuit whenever said output voltage increases substantially above zero.

The aforementioned EXCLUSIVE OR circuits comprise first and second transistors, the collector of the first transistor coupled to the base of the second transistor, means biasing the emitter of the second transistor slightly more positive than emitter bias on the first transistor, first input means coupled to the base of the first transistor and the base of the second transistor, second input means coupled to the base of the first transistor and the base of the second transistor, and circuit means coupled to the collector of the second transistor for providing an output voltage when and only when either the first or second input is energized.

In general, the invention contemplates first and second counters, switching means for abruptly setting a predetermined count into the first counter, said first counter running at a rate responsive to the pulse repetition rate of a train of input pulses, a rate modifier circuit also receiving said train of input pulses, coincidence detector means responsive to the count in the first and second counters for providing a signal to the rate modifier whenever the count in the first counter is out of correspondence with the count in the second counter, said rate modifier coupling said pulse train directly to the second counter only when no signal is provided from the coincidence detector means, and comparator means responsive to the count in the first and second counters and selectively providing one of the two output signals to the rate modifier in accordance with whether the count in the second counter leads or lags the count in the first counter by more or less than 50% of counter capacity, for increasing or decreasing the count in the second counter accordingly. The selected signal from the comparator means thereupon introduces pulses into said pulse train or removes pulses from said pulse train at a substantially fixed pulse repetition rate, thereby increasing or decreasing the total number of pulses in each pulse train in accordance with relative counts in the first and second counters, said rate modifier coupling the modified pulse train to the second counter, thereby smoothly and expeditiously bringing the second counter into correspondence with the first counter.

In accordance with the foregoing, it is one object of this invention to provide a system for changing traffic signal offsets in response to a command from a master controller in a smooth, critically damped manner, with a minimal amount of traffic disruption.

Another object is to provide a fully electronic system for restoring synchronism between a pair of digital counters operating in response to a pulse train, when one of the counters is abruptly reset to a new count, by changing the number of pulses in the pulse train applied to the other of the counters in order to drive said other of the counters at an altered rate with respect to said one of the counters until synchronism is restored.

Another object is to provide novel comparator means responsive to the counts in each of a master and a slave counter, whereby one of two output signals is provided in response to an asynchronous conditon of the counters, depending upon whether the slave counter is to run at an increased or decreased rate in order to most expeditiously be brought into synchronism with the master counter.

Another object is to provide a pulse rate modifier circuit wherein pulses are added to or removed from a pulse train in response to either one of two applied signals without unwanted interference with the pulses in the train.

Another object is to provide a simplified EXCLUSIVE OR circuit requiring few circuit elements.

Other objects and advantages of the invention will become apparent from the following detailed description when read in conjunction with the accompanying drawings, in which.

DESCRIPTION OF BLOCK DIAGRAM—FIGURES 1 AND 4

Figure 1:
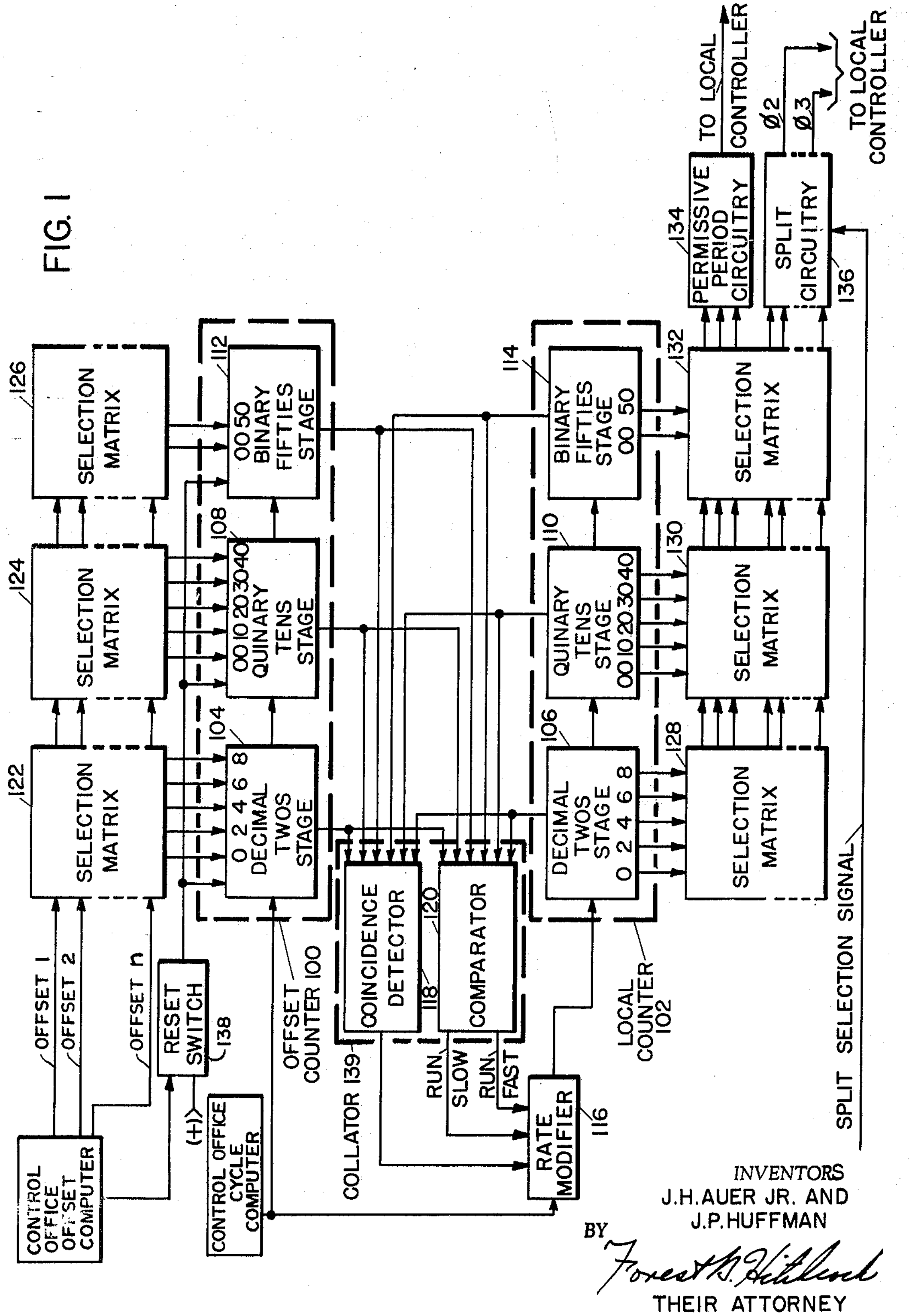
FIG. 1 is a block diagram of the novel traffic signal offset and split control system.

Turning first to FIG. 1, there is shown a master counter 100, known as the offset counter, and a slave counter 102, known as the local counter, each adapted to count in biquinary-decimal fashion, with separate stages for counting decimal twos, quinary tens and binary fifties. Hence, each counter respectively comprises a decimal twos counting stage 104 and 106, a quinary tens counting stage 108 and 110, and a binary fifties counting stage 112 and 114. Each counting stage preferably comprises a ring counter, although other types of well-known counters may be utilized if desired. By use of the biqunary-decimal counting system, a single even decimal digit is represented by a three-out-of twelve code. Such code redundancy facilitates collation. By counting only even decimal digits, provided in a manner described below, the system hereby disclosed operates with 2% resolution, since maximum counter capacity is selected to be 100 counts. This resolution provides sufficient accuracy for traffic signal operation.

Offset counter 100 and local counter 102 are driven by a cycle rate signal received from a cycle computer such as that described in J. H. Auer, Jr. application Ser. No. 306,036, filed September 3, 1963. This cycle rate signal, which provides background cycle information to a plurality of traffic signal local controllers comprises a train of pulses such as those illustrated by curve A in FIG. 4. In the description to follow, it will be assumed that each cycle comprises 100 pulses, as originated from the cycle computer with alternate pulses of each cycle removed by circuitry communicating cycle length information to the instant invention. For example, only even-numbered pulses in each cycle may reach counters 100 and 102. Thus, each decimal twos stage counts every received pulse, with each pulse thereby representing a count of two pulses produced by the cycle computer. A standard pulse counting stage, such as a ring counter, may then be used for each decimal twos stage. In event a system having 1% resolution is desired however, it is merely necessary to couple each pulse produced by the cycle computer to the counters of the instant invention and to replace each 5 stage decimal twos counter stage with a 10 stage decimal digits counter stage. This would provide adaptability of counting from 0–99 in increments of ones.

Figure 4:
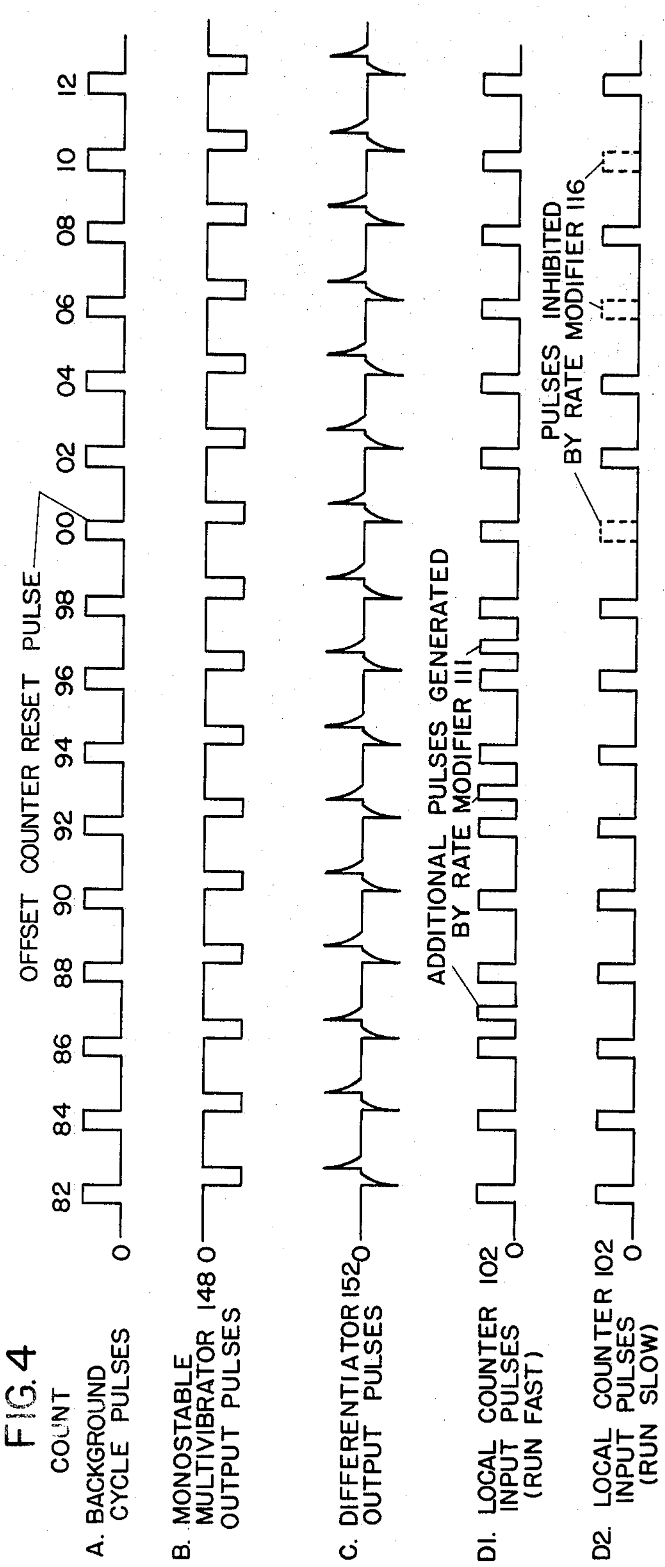
FIG. 4 is an illustration of voltage waveforms associated with the rate modifier of FIG. 2.

It should be noted that although the pulses of the background cycle pulse train are shown in FIG. 4 as being equally spaced in time, such condition is not necessarily always true, since a change in cycle duration requires either compression or expansion of the background cycle pulse train by alteration of the pulse repetition rate. Inasmuch as this change in pulse repetition rate merely affects the speed at which the local and offset counters operate, no correction is made at the input to the local counter for such change. The system of FIG. 1 therefore provides correction for the local counter only when the local counter is out of synchronism with the offset counter. This condition occurs when an abrupt change in offset is called for, producing a new count in the offset counter, but not when a change in cycle duration is called for.

Alteration of the background cycle pulses applied to the local counter is achieved by a rate modifier 116 which receives the cycle rate pulses prior to their application to the local counter, and either couples these pulses to the local counter without alteration, or adds or subtracts pulses to the background cycle pulses in response to whether the local and offset counters are out of step with each other, as well as in response to the amount by which the local counter lags or leads the offset counter.

Counts in counters 100 and 102 are continuously sensed by a collator 139 comprising a coincidence detector 118 and a comparator 120. Determination of whether the local and offset counters are in step with each other or not is made by the coincidence detector which receives inputs from the decimal twos stage, quinary tens stage and binary fifties stage of both the local and offset counters. Individual detections of the digits registered in the pair of decimal twos stage, the pair of quinary tens stages and the pair of binary fifties stages are made within the coincidence detector. In event the digits registered in any one of the aforementioned pairs are not identical, an output signal is supplied from coincidence detector 118 to rate modifier 116, preventing the background cycle rate signal pulses from being directly applied, without alteration, to local counter 102.

Comparator circuit 120, also coupled to both decimal twos stages, both quinary tens stages and both binary fifties stages then makes a decision as to whether the local counter count can be brought into correspondence with the offset counter count most expeditiously by either slowing the local counter counting rate to permit the offset counter to catch up, or by hastening its counting rate in order to overtake the offset counter. This decision is made by subtracting the count in the local counter from the count in the offset counter to determine whether the difference obtained thereby is a positive or negative number and whether this positive or negative number is greater or less than fifty. If the difference is positive and less than fifty, the comparator provides a RUN FAST signal to the rate modifier, thereby increasing the number of pulses in each cycle of background pulses applied to the local counter, causing the local counter to count at a faster rate than the offset counter. In event the aforementioned difference is a positive number greater than or equal to 50, the comparator provides a RUN SLOW signal to the rate modifier, causing the rate modifier to remove a number of pulses in each background cycle, thereby causing the local counter to run at a slower rate than the offset counter. Similarly, in event the aforementioned difference is a negative number less than 50, the comparator provides a RUN SLOW signal to the rate modifier, causing the local counter to run more slowly than the offset counter, while in the event the aforementioned difference is a negative number greater than or equal to 50, the comparator provides a RUN FAST signal to the rate modifier, causing the speed at which local counter 102 runs, to exceed the speed at which offset counter 100 runs. Curve D1 of FIG. 4 is an illustration of the background cycle pulse train as modified by rate modifier 116 when comparator 120 provides a RUN FAST signal to the rate modifier, while curve D2 of FIG. 4 is an illustration of the pulse train provided to the local counter from the rate modifier when a RUN SLOW signal is provided to the rate modifier from the comparator.

Counts are initially set directly into the offset counter by means of applied voltages received through suitable communication means from the offset computer for the section. One such offset computer is disclosed in J. H. Auer, Jr. et al. application Ser. No. 305,967, filed September 3, 1963. With each change of offset, at zero background time, a reset signal is first applied to the twos, tens and fifties stages of the offset counter through a reset switch 138, momentarily removing energy from the stages, thereby extinguishing the counts previously existing therein. Energy for these stages is then reapplied through the reset switch. A new offset is also supplied from the offset computer, providing a new control to each stage of the offset counter through separate selection matrices at zero background time. Hence, offsets are applied to offset counter stages 104, 108 and 112 through selection matrices 122, 124 and 126, respectively. That is, for each received offset siganl, matrix 122 provides energy on one of its five output leads, thereby selecting a twos digit for stage 104. Simultaneously, matrix 124 provides energy on one of its five output leads, thereby selecting a tens digit for stage 108, while matrix 126 provides energy on one of its two output leads, thereby selecting a fifties digit for stage 112. Thus, by means of matrix selection, each separate offset bus provides output energy on one of each output lead from each selection matrix. The selection matrices may be of the pinboard type, or other similar matrix permitting easy connection and disconnection between columns and rows of the matrix. This permits establishment of different local controller offsets at each local controller in response to energization of a single offset bus. Such selection of local offset may be accomplished by maintenance personnel at the various local controller locations, simply by making connection between predetermined rows and columns of the matrices, in accordance with instructions provided by traffic engineering personnel.

Outputs from local counter stages 106, 110 and 114 are coupled respectively to selection matrices 128, 130 and 132. Each output bus passed horizontally through selection matrices 128, 130 and 132 receives energization from one and only one output lead of each local counter stage. Thus, each output bus through matrices 128, 130 and 132 receives energization from three separate leads, preferably through unidirectional conducting means, as described infra. In this fashion, energization of a single output bus from matrices 128, 130 and 132 represents a specific local counter count.

Output voltage from selection matrices 128, 130 and 132 is coupled to permissive period circuitry 134 and split circuitry 136. The permissive period circuitry is utilized when the local controller is traffic-actuated; that is, operated in accordance with demands of traffic as registered by actuation of vehicle or pedestrian detectors. This category includes both semi-traffic-actuated signals in which means are provided for traffic actuation on one or more but not all approaches to the intersection controlled by the signal and full traffic-actuated signals in which means are provided for traffic actuation on all approaches to the intersection controlled by the signal. The permissive period represents an interval of time during which a local controller may change from a final phase, designated phase A, to a first phase, designated phase B. Hence, if a vehicle is detected on an approach controlled by phase B at any time during the permissive period, the local controller may immeditaely switch to that phase, thereby immediately displaying a green indication to the detected vehicle. In event a vehicle is detected on the approach controlled by phase B at some time outside the permissive period, this fact is stored within the local controller, which is subsequently permitted to switch to phase B at the beginning of the next permissive period.

Output signals supplied from the system of FIG. 1 to a non-traffic-actuated two phase local controller must comprise an offset pulse, indicative of zero local time, and a split pulse, indicative of the instant in the local cycle at which phase B ends and phase A begins. The offset pulse is detected as the leading edge of the permissive period pulse, since this pulse begins at local time zero. The time at which the split pulse from split circuitry 136 occurs is determined by row-to-column connections in selection matrices 128, 130 and 132. The split pulse determines the proportions of signal cycle allotted to phases A and B. Hence, in a non-traffic-actuated controller, phase B begins with the offset pulse at zero local time and is terminated by the split pulse occurring at a predetermined time in the local cycle. For example, if it is desired to allocate 60% of the cycle to phase A and 40% to phase B, matrix connections between the local counter and the split circuitry would be made by energizing a first matrix bus from the 00 output lead of binary fifties stage 114, energizing a second matrix bus from the 40 output lead of quinary tens stage 110 and energizing a third matrix bus from the 0 output lead of decimal twos stage 106. Thus, when local counter 102 reaches count 40, each of the latter three buses is energized. This provides a split signal $\phi 2$ from split circuitry 136 to the local controller, causing the controller to switch from phase B, if it is in that phase, to phase A. The split circuitry is so arranged that by means of a split selection signal from the section master controller, any one of a number of splits may be remotely selected to comprise split signal $\phi 2$. Phase A is terminated by the offset pulse at zero local time.

In event the system of FIG. 1 is used with a three phase local controller, two split pulses are necessary; one to terminate phase B and one to terminate an intermediate phase, designated phase C. The system of FIG. 1 is adaptable for use with a three phase local controller simply by utilization of three additional buses, each coupled through matrices 128, 130 and 132 to split circuitry 136. Each of these three additional buses is separately coupled to a single output lead from each stage of local counter 102 in a manner similar to that previously described, whereby a local counter count higher than the count initiating the change from phase B to phase C is coupled to split circuitry 136 to initiate a change from phase C to phase A. The change from phase C to phase A is provided by a signal designated $\phi 3$. Again, as with a two phase local controller, phase A is terminated by the offset pulse at zero local time.

To briefly recapitulate operation of the system of FIG. 1, assume offset counter 100 and local counter 102 are in synchronism with each other when a new offset is called for. A reset signal is momentarily applied through reset switch 138 to the stages of offset counter 100, extinguishing its count. An offset bus coupled to matrices 122, 124 and 126 is then energized, coupling a predetermined count to each offset counter stage, depending upon which input lead to each stage is energized thereby. It should be noted that any number of offsets *n* may be selected in this manner, by energization of the proper offset bus.

When a new offset signal is applied to offset counter 100, the counter immediately assumes the new count and continues counting at a rate controlled by the pulse repetition rate of the received cycle rate signal. However, local counter 102 is not similarly discontinuously reset to a new count by the new offset signal. Hence, the counts in offset counters 100 and local counter 102 are suddenly out of correspondence with each other. This condition is sensed by coincidence detector 118 which actuates rate modifier 116, preventing the unaltered cycle rate signal from reaching the local counter. Simultaneously, comparator 120 detects whether the most expeditious direction for local counter 102 to move relative to offset counter 100 in order to resynchronize itself with the offset counter would be backward or forward. If the most expeditious direction is backward, a RUN SLOW signal is applied to rate modifier 116, thereby causing removal of pulses from the cycle rate signal at a substantially fixed repetition rate, prior to application of the now altered cycle rate signal to the local counter. Under these conditions, for each complete cycle, local counter 102 counts less than 100 units. On the other hand, if comparator 120 determines that the most expeditious direction for local counter 102 to move relative to offset counter 100 in order to resynchronize itself with the offset counter is forward, a RUN FAST signal is applied to rate modifier 116, causing addition of pulses at a substantially fixed repetition rate to the received cycle rate signal. Under these conditions, more than 100 units are counted by counter 102 during each cycle. As long as counters 100 and 102 remain out of synchronism, the cycle rate signal applied to local counter 102 continues to be altered by rate modifier 116 at the predetermined substantially fixed repetition rate. When synchronism between the counters is finally achieved, coincidence detector 118 responds by removing energization from rate modifier 116, thereby permitting the cycle rate signal to reach local counter 102 through the rate modifier without modification.

Outputs from local counter 102 control operation of the local controller associated therewith through permissive period circuitry 134, which provides an output signal at zero local time to demarcate the start of phase B in a non-traffic-actuated controller. The length of the permissive period is determined by connections between the local counter and selection matrices 128, 130 and 132, in the manner previously described. In event the local controller is traffic-actuated, a vehicle detected on an approach to phase B during the permissive period causes immediate change of the local controller to phase B; if the vehicle is detected outside the permissive period, phase B is not initiated until the start of the next permissive period, while as long as no vehicles are detected on the approach to phase B, the local controller does not operate in phase B.

Signal split is also controlled by connections from the local counter through selection matrices 128, 130 and 132 to split circuitry 136. Depending upon the local counter count selected by row-to-column connections in matrices 128, 130 and 132, a split signal $\phi 2$ is supplied to the local controller at the instant this count appears in local counter 102. Any one of a number of splits is remotely selectable in this manner. In event the local controller is of the three phase type, a second split signal $\phi 3$ may be preselected by row-to-column connections in matrices 128, 130 and 132, in a manner similar to that by which selection of the first split is made. Again, remote selection of one of a number of possible splits, such as three, to comprise the second split signal may be made by means of the split selection signal.

DESCRIPTION OF RATE MODIFIER BLOCK DIAGRAM—FIGURE 2

Figure 2:
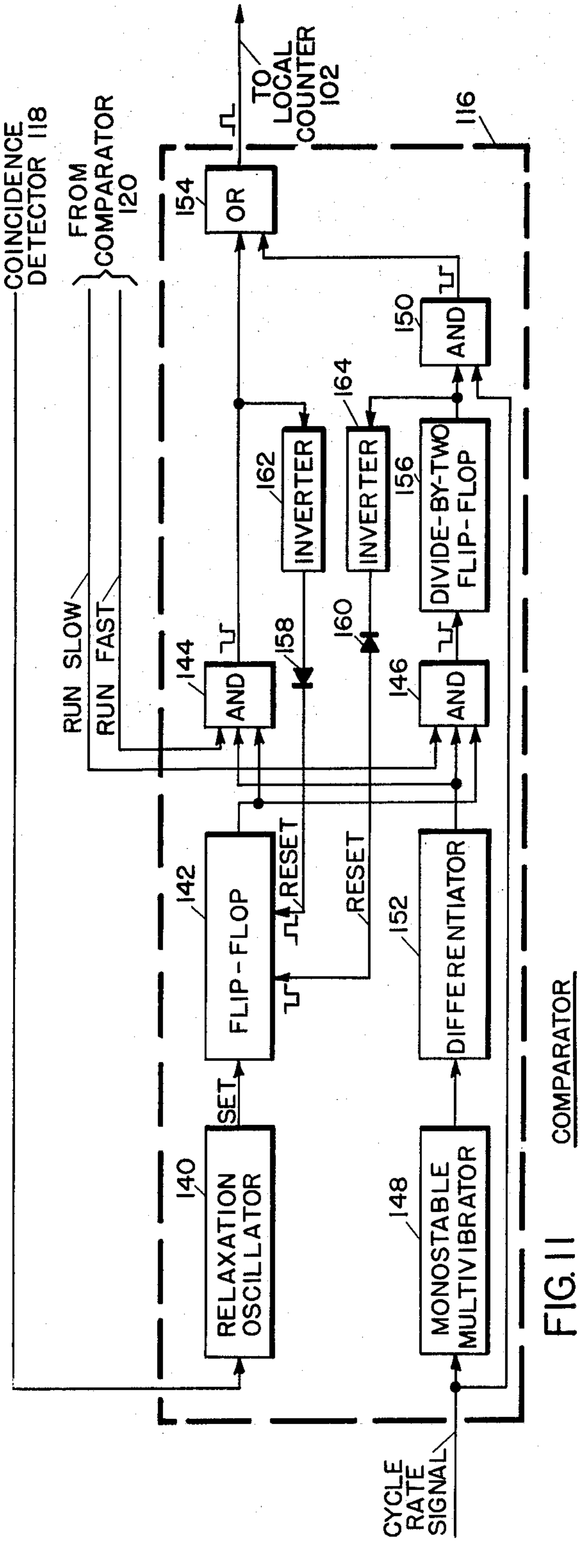
FIG. 2 is a block diagram of the rate modifier circuit used in the system of FIG. 1.

FIG. 2 is a block diagram of rate modifier 116 used in the system of FIG. 1. The circuit comprises a constant frequency relaxation oscillator 140, the output of which is coupled to a bistable multivibrator or flip-flop circuit 142, such as a standard Eccles-Jordan circuit. Output energy from flip-flop circuit 142 provides a first input to each of two three-input AND circuits 144 and 146.

A pulse train comprising the cycle rate signal is applied to the input of a monostable multivibrator 148, and to a first input of an AND circuit 150. Uniform output pulses produced by monostable multivibrator 148 in response to the received pulse train and illustrated by curve B in FIG. 4 are differentiated by a differentiator circuit 152 to supply second inputs to AND circuits 144 and 146. A third input to AND circuit 144 is provided by the RUN FAST signal from comparator 120 of FIG. 1, while a third input to AND circuit 146 is provided by the RUN SLOW signal from the comparator. Simultaneous presence of energy on all three input leads to AND circuit 144 produces a negative-going output pulse which is applied through an OR circuit 154 to local counter 102 of FIG. 1. Similarly, simultaneous presence of energy on all three input leads to AND circuit 146 produces a negative-going output pulse which is applied to the input of a divide-by-two flip-flop circuit 156. This circuit provides an output pulse starting with application of a first input pulse and ending with application of a second input pulse, so that a single output pulse is provided from flip-flop circuit 156 for each pair of input pulses. Thus, application of alternate pairs of input pulses to flip-flop circuit 156 demarcates alternate intervals during which steady output voltage or no output voltage is provided from flip-flop circuit 156. Output voltage from flip-flop circuit 156 is provided to a second input of AND circuit 150. A negative-going output pulse is coupled from AND circuit 150 through OR circuit 154 and on to local counter 102 of FIG. 1 upon simultaneous energization of both inputs to the AND circuit. Flip-flop circuit 142 is reset either by output from AND circuit 144 through a series-connected inverter 162 and diode 158, or by output from divide-by-two flip-flop circuit 156 through a series-connected inverter 164 and diode 160. It should be noted that each AND circuit of FIG. 2 provides a large positive output voltage when less than all of its inputs are energized. OR circuit 154 is responsive to negative-going pulses only.

In operation, so long as offset counter 100 and local counter 102 of FIG. 1 remain in synchronism, no output signal is provided from coincidence detector 118 to relaxation oscillator 140. Under these conditions, relaxation oscillator 140 is not energized, maintaining flip-flop circuit 142 in a reset condition, preventing energy from being coupled to one of the inputs to each of AND circuits 144 and 146. No input pulse is thereby provided to divide-by-two flip-flop circuit 156, allowing the flip-flop to continue to provide a steady output voltage which thereby fulfills one input to two-input AND circuit 150, while the second input to AND circuit 150 is fulfilled each time a line pulse in the received cycle rate signal occurs. Under these conditions the line pulse drives local counter 102 through OR circuit 154 at a rate governed by the cycle rate signal. When coincidence detector 118 determines that offset counter 100 and local counter 102 are out of synchronism, relaxation oscillator 140 is actuated by a signal from the coincidence detector. Simultaneously, comparator circuit 120 checks the local and offset counters to determine whether the local counter should run at a rate faster or slower then the offset counter in order to most expeditiously resynchronize both counters.

When the comparator determines that the local counter should be driven at a rate faster than the offset counter in order to most expeditiously resynchronize the counters, additional pulses provided by relaxation oscillator 140 are added to the cycle rate signal. Since there is no regular phase relation between the relaxation oscillator output signal and the cycle rate signal, there exists a possibility that a pulse supplied by the relaxation oscillator may occur simultaneously with a cycle rate signal pulse. To prevent such possibility, the output of relaxation oscillator 140 is stored in flip-flop circuit 142 by setting, or turning on the flip-flop, providing a steady output voltage therefrom. This information remains unused until just after the next cycle rate signal pulse has ended. Monostable multivibrator 148 provides delay of each cycle rate signal pulse by an amount equal to the time duration of each background cycle pulse, since it is triggered by the negative-going portion of each background cycle pulse. The delayed output from multivibrator 148 is differentiated by differentiator 152 and fulfills the second input to AND circuit 144. The RUN FAST signal from comparator 120 energizes the third input to AND circuit 144, while the first input is energized by the set, or on condition, of flip-flop circuit 142. Since the RUN SLOW signal to AND circuit 146 is not supplied from comparator 120, divide-by-two flip-flop circuit 156 remains in the on, or set condition, providing an input signal to AND circuit 150. During this time, each pulse comprising the cycle rate signal is coupled through AND circuit 150 and OR circuit 154 to local counter 102. In addition, since each pulse provided from relaxation oscillator 140 triggers flip-flop circuit 142 into its set, or on condition, the immediately succeeding differentiated monostable multivibrator output pulse is coupled through AND circuit 144 and OR circuit 154 to local counter 102.

As previously mentioned, the pulses supplied from differentiator 152 are prevented from occurring simultaneously with a background cycle rate signal pulse because of the delay introduced by monostable multivibrator 148. This can be seen by referring to the waveforms of FIG. 4, where background cycle pulses comprising the cycle rate signal are illustrated as curve A and monostable multivibrator 148 output pulses are illustrated as curve B. It will be noted that each monostable multivibrator output pulse is initiated only upon completion of its initiating background cycle pulse. Curve C represents the output pulses produced by differentiator 152 in response to pulses supplied thereto from the monostable multivibrator. Since AND circuit 144 is responsive only to positive pulses, the negative pulses provided from differentiator 152 have no effect thereon. Reference to curves A and C of FIG. 4 shows that each differentiator output pulse occurs at a fixed time subsequent to completion of its initiating background cycle pulse, so that no differentiator output pulse can occur simultaneously with a background cycle pulse, while curve D1 illustrates addition of pulses to the background cycle applied to local counter 102 for the purpose of hastening the counting rate, until the local counter has been resynchronized with the offset counter just before count 98. As shown in FIG. 2, each output pulse from AND circuit 144 is fed back to flip-flop circuit 142 through diode 158, after a polarity reversal by inverter 162, thereby resetting the flip-flop, deenergizing the second input to AND circuit 144. The diode prevents inadvertent setting of the flip-flop by negative voltage on the RESET lead when AND circuit 144 provides a large positive output voltage. However, the next pulse provided from relaxation oscillator 140 again set flip-flop circuit 142, and AND circuit 144 again receives an input signal therefrom.

In event comparator 120 provides a RUN SLOW signal to rate modifier 116 in order to most expeditiously bring local counter 102 into synchronism with offset counter 100, AND circuit 146 couples output pulses provided from flip-flop circuit 142 to divide-by-two flip-flop circuit 156, in a manner similar to that previously described by which AND circuit 144 couples output pulses from flip-flop circuit 142 to OR circuit 154 when comparator 120 provided a RUN FAST signal. The first output pulse from AND circuit 146 resets flip-flop circuit 156, which thereupon provides a voltage substantially at zero potential to one input of AND circuit 150. Since the background cycle rate signal pulses are positive polarity and AND circuit 150 is responsive only to simultaneously positive voltages at both its inputs, the background cycle pulse immediately following the drop in output potential from divide-by-two flip-flop circuit 156 is not transmitted through AND circuit 150 to OR circuit 154, and hence is prevented from reaching local counter 102. In this fashion, a single pulse is removed from the background cycle rate signal transmitted to local counter 102, causing the counter to run at a slower rate than the offset counter. It should be noted that the drop in output potential from flip-flop circuit 156 occurs at the instant a positive output pulse is provided from differentiator circuits 152. This positive pulse cannot occur simultaneously with a background cycle rate signal pulse for reasons already described.

Flip-flop circuit 142 is not immediately reset by the drop in output potential from flip-flop circuit 156, since inverter 164 provides a positive pulse at the cathode of diode 160 in response thereto. Because the diode is thus reverse-connected, this pulse is prevented from energizing the RESET lead coupled thereto. However, as illustrated in FIG. 4, differentiator circuit 152 provides a positive output pulse prior to occurrence of the next background cycle rate signal pulse. This differentiator output pulse is applied to AND circuit 146 simultaneously with output energy from flip-flop circuit 142, which is still in the on, or set condition, and hence is coupled through AND circuit 146 to divide-by-two flip-flop circuit 156, which thereupon applies a positive potential to AND circuit 150. Hence, the next-following background cycle rate signal pulse is coupled through AND circuit 150 to OR circuit 154, and thence to local counter 102. Moreover, flip-flop circuit 142 is reset by the abrupt increase in positive output potential from flip-flop circuit 156, since inverter 164 provides a negative output potential, which resets flip-flop circuit 142 through diode 160, which is now poled in the forward direction. Curve D2 of FIG. 4 illustrates removal of pulses from the background cycle applied to local counter 102 for the purpose of slowing the counting rate when the local counter has fallen out of synchronism with the offset counter somewhere prior to count 100 or 00.

DESCRIPTION OF FLIP-FLOP CIRCUIT—FIGURE 3

Figure 3:
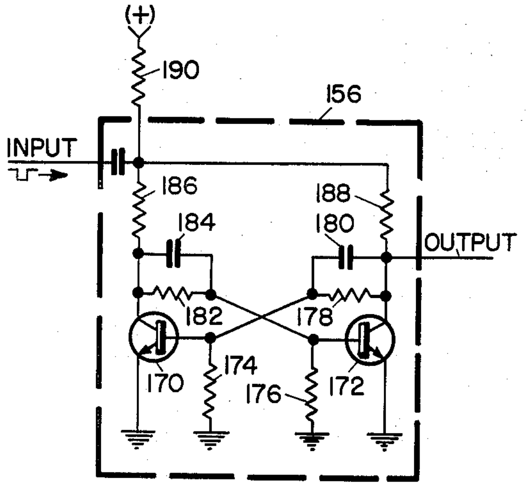
FIG. 3 is a schematic diagram of the divide-by-two flip-flop of FIG. 2.

FIG. 3 is a schematic diagram of divide-by-two flip-flop circuit 156, used in the rate modifier of FIG. 2. The circuit comprises a pair of transistors 170 and 172, the emitters of which are grounded. The base of transistor 170 is coupled to ground through a resistor 174, while the base of transistor 172 is coupled to ground through a resistor 176. Moreover, the base of transistor 170 is RC coupled through a parallel-connected resistor 178 and capacitor 180 to the collector of transistor 172, while the base of transistor 172 is RC coupled through a parallel-connected resistor 182 and capacitor 184 to the collector of transistor 170. Negative input pulses are capacitively coupled through a collector load resistor 186 to the collector of transistor 170 and through a collector lead resistor 188 to the collector of transistor 172. Positive bias is applied to collector load resistors 186 and 188 through a common bias resistor 190. Output potential is supplied from the collector of transistor 172. It should be noted that collector load resistor 186 is of greater ohmic value than collector resistor 188, while coupling resistor 178 is of greater ohmic value than coupling resistor 182. This assures that when the bias voltage is applied, and prior to any input pulse, transistor 170 will be conductive and transistor 172 will be non-conductive. This assures that output potential is of positive polarity prior to application of any input pulses. Because resistor 178 is of greater ohmic value than resistor 182, the time required for capacitor 184 to charge to a given potential is greater than the time required for capacitor 180 to charge to the same potential. Hence, as capacitor 180 charges faster than capacitor 184, the base of transistor 170 is driven positive at a rate faster than the base of transistor 172. Moreover, since the ohmic value of resistor 186 is greater than that of resistor 188, more current is supplied to the base of transistor 170 than to the base of transistor 172 when the bias potential is initially applied. The combination of the foregoing factors causes transistor 170 to be driven harder into conduction than transistor 172. Hence, transistor 170 is turned on in preference to transistor 172 when positive bias potential but no input pulses are applied to the circuit.

In operation, when bias potential is applied to resistor 190, prior to application of input pulses, transistor 170 conducts and transistor 172 is at cutoff, as already pointed out. Hence, output voltage amplitude of circuit 156 is close to the power supply voltage amplitude, since the ohmic values of resistor 178 is considerably greater than the ohmic values of resistors 188 and 190. However, since transistor 170 is conducting, its collector is held at a low potential, exceeding ground potential only by the collector-emitter drop across the transistor. Since this drop is extremely small, it may be neglected, so that the collector of transistor 170 may be considered at ground potential. Under these circumstances, capacitor 184 remains uncharged, since no voltage drop appears across resistor 182. However, capacitor 180 charges to a potential equal to the voltage drop across resistor 178.

Application of the first input pulse to flip-flop circuit 156 from AND circuit 146 of FIG. 2, being of negative polarity, abruptly drops collector voltage on both transistors 170 and 172. The base of transistor 170 is thereby driven to a greater negative potential than the base of transistor 172 by a voltage of amplitude substantially equal to that stored on capacitor 180. Hence, transistor 179 is driven much further into cutoff than transistor 172 throughout the duration of the applied input pulse. After the input pulse is removed, positive bias again reappears on the collectors of both transistors. However, because of the stored charge on capacitor 180, the base of transistor 170 is held at a potential considerably below the positive voltage applied to the base of transistor 172. As a result, transistor 172 becomes conductive, and its collector potential falls substantially to ground. Hence, the base of transistor 170 is held substantially at zero potential, even after the charge stored on capacitor 180 has leaked off through resistor 178. This keeps transistor 170 in a non-conductive condition. Moreover, since the collector of transistor 172 is substantially at ground potential, the circuit output voltage is also substantially at ground potential.

Application of the next negative input pulse from AND circuit 146 again drops the collector voltage on both transistors and drives the bases of both transistors negatively. However, because of a charge now stored on capacitor 184, acquired in a manner identical to acquisition of a charge by capacitor 180 when transistor 170 conducts, the base of transistor 172 is driven further negative than the base of transistor 170. Hence, when the input pulse is removed, the base of transistor 170 becomes slightly positive, while the base of transistor 172 is held at a much lower potential due to the voltage stored on capacitor 184. As a result, transistor 170 becomes conductive, rather than transistor 172. The charge on capacitor 184 leaks off through resistor 182, while capacitor 180 again builds up charge. Meanwhile, since transistor 172 is now non-conductive, output potential again jumps to a positive value. Thus, it is obvious that each odd input pulse provides no output voltage from flip-flop circuit 156, while each input pulse provides a positive output voltage therefrom. Hence, the circuit operates as a divide-by-two flip-flop circuit.

DESCRIPTION OF PERMISSIBLE PERIOD CIRCUITRY—FIGURE 5

Figure 5:
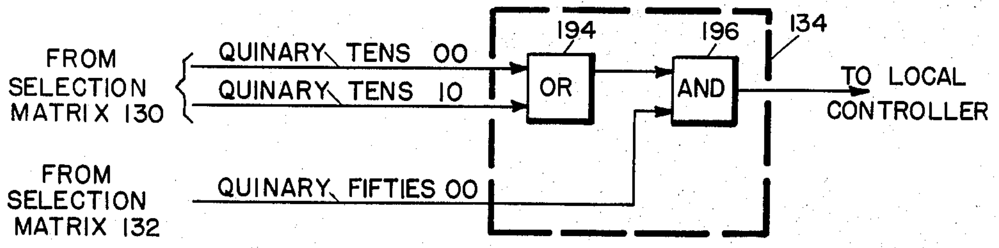
FIG. 5 is a block diagram of the permissive period circuitry used in the system of FIG. 1.

FIG. 5 illustrates permissive period circuitry 134, used in the system of FIG. 1, and comprises an OR circuit 194, the output of which provides a first input signal to a two-input AND circuit 196. A first input is coupled through OR circuit 194 from the 00 output of the local counter quinary tens stage 110 through selection matrix 130, while a second input is applied to OR circuit 194 from the 10 output of local counter quinary tens stage 110 through selection matrix 130. Similarly, a second input is applied to two-input AND circuit 196 from the 00 output of the local counter binary fifties stage 114 through selection matrix 132. Output of AND circuit 196 is coupled to the local controller associated therewith.

The permissive period circuitry provides a permissive period signal for the local controller lasting from count 00 through count 18 of local counter 102. During these counts, an output potential is coupled from either the 00 or 10 output terminal of local counter quinary tens stage 110, and an output potential is similarly provided from the 00 output terminal of the local counter binary fifties stage 114. These conditions combine to provide an output potential from AND circuit 196 to the local controller during the entire permissive period, permitting the local controller to immediately change phase in event a vehicle is detected on the traffic-actuated phase during the permissive period. This circuit has utility where the local controller is of the traffic-actuated type. Moreover, if more than one phase of the local controller is to be traffic-actuated, additional permissive period circuitry may be provided. This circuitry would be similar to that shown in FIG. 5, with the exception that the circuit logic would provide the requisite permissive period by coupling different outputs from the selection matrices to the local counter, thereby providing separate permissive period signal to the local controller.

DESCRIPTION OF SPLIT CIRCUITRY—FIGURE 6

Figure 6:
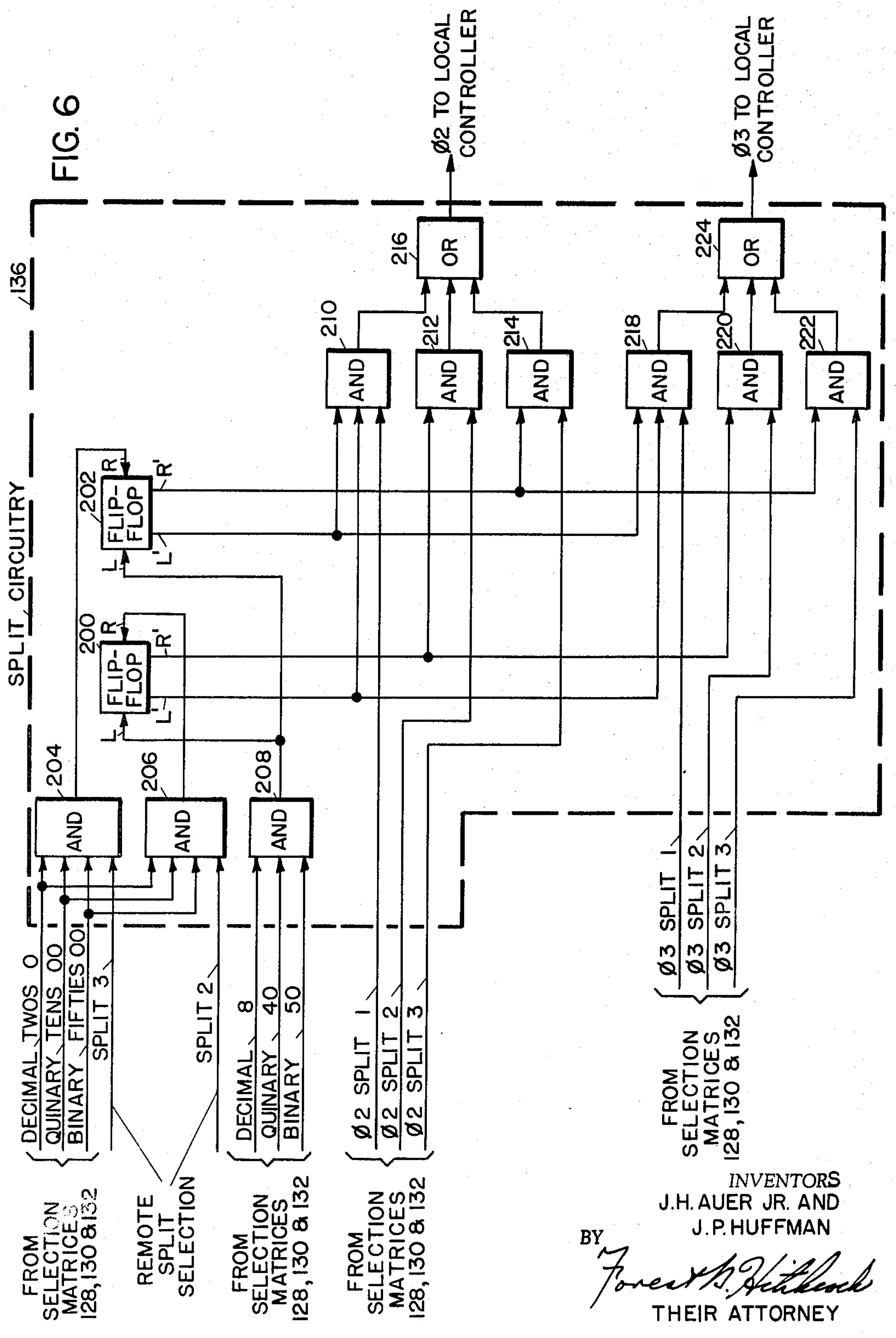
FIG. 6 is a block diagram of the split circuitry used in the system of FIG. 1.

Turning now to FIG. 6, there is shown a block diagram of split circuitry 136, used in the system of FIG. 1. This circuitry is necessary for use with non-traffic-actuated and semi-traffic-actuated local controllers. The split circuitry comprises a pair of conventional flip-flop circuits 200 and 202, each of which has a pair of input leads marked L and R and a pair of output leads marked L′ and R′. These markings indicate that energization of input lead L to either flip-flop circuit produces energy on output lead L′ of the same flip-flop, while energy on input lead R to either flip-flop circuit produces energy on output lead R′ of the same flip-flop. A pair of four-input AND circuits 204 and 206 each have three inputs in common. First input leads are coupled to the 0 output terminal of local counter decimal twos stage 106 through selection matrix 128. Similarly, second inputs to AND circuits 204 and 206 are coupled to 00 terminal of local counter quinary tens stage 110 through selection matrix 130, while third inputs to AND circuits 204 and 206 are coupled to the 00 output terminal of local counter binary fifties stage 114 through selection matrix 132. The fourth input to AND circuit 204 comprises a first remote split selection lead, while the fourth input to AND circuit 206, comprises a second remote split selection lead. Each remote split selection lead may be separately energized. Energization of either remote split selection lead provides an output voltage from the AND circuit coupled thereto at the instant local counter 102 registers count 00. Output voltage from AND circuit 204 energizes the R side of flip-flop circuit 202, thereby causing energization of the R′ lead coupled thereto. Similarly, output potential from AND circuit 206 energizes the R side of flip-flop circuit 200, thereby causing energization of the R′ output lead coupled thereto.

Energy is supplied to the L input side of both flip-flop circuits 200 and 202 from a three-input AND cricuit 208. A first input to AND circuit 208 is provided from the 8 terminal of local counter decimal twos stage 106 through selection matrix 128. A second input to AND circuit 208 is provided from the 40 output terminal of local counter quinary tens stage 110 through selection matrix 130, while the third input is provided from the 50 output terminal of local counter binary fifties stage 114 through selection matrix 132. Energization of the L input leads to flip-flop circuits 200 and 202 produces energization of the L′ output leads from the aforementioned flip-flop circuits and removes energization from the R′ output leads of the flip-flop circuit in a manner well known in the art. Moreover, energization of neither remote split selection lead causes the L′ output leads to remain energized throughout the duration of the entire background cycle.

In event the local controller operated by the system of FIG. 1 is a two phase controller, a choice of three split signals is provided from a group of three AND circuits 210, 212 and 214 through an OR circuit 216. AND circuit 210 is a three-input AND, receiving energy at its first input from output L′ of flip-flop circuit 202 and at its second input from output L′ of flip-flop circuit 200. The third input is energized from selection matrices 128, 130, 132 when the local counter reaches a predetermined count, selected by coupling one output from each stage of local counter 102 to a conductor constituting a common row in the matrices. Since these matrices may be of the pinboard type, coupling between rows and columns in the matrices may be accomplished by bidirectional conducting pins or unidirectional conducting pins. Similarly, AND circuit 212 is a two-input AND, one input of which is energized by output R′ of flip-flop circuit 200 and the other of which is energized from a common row through matrices 128, 130 and 132, energized by a single output from each stage of the local counter when the counter reaches a count preselected by joining the latter row with an output lead from each stage of the local counter. Similarly, AND circuit 214 is a two-input AND, receiving energization at a first input from output R′ of flip-flop circuit 202 and at a second input from a common row of matrices 128, 130 and 132 energized by a predetermined count in local counter 102 in a matter similar to that already described for splits 1 and 2.

Output energy is coupled from one of AND circuits 210, 212 and 214 through OR circuit 216 to the two phase local controller for determining when the split is to occur. However, in event the traffic signal operated by the local controller is a three phase signal, a trio of AND circuits 218, 220 and 222 are used for providing energy through a three-input OR circuit 224, which thereupon constitutes a second split signal to the three phase local controller. AND circuits 218, 220 and 222 are identical in operation to AND circuits 210, 212 and 214 respectively. Hence, AND circuits 218 is a three-input AND, having two inputs energized by outputs L′ of flip-flop circuits 200 and 202, while the third input is energized from a matrix row common to matrices 128, 130 and 132. Similarly, AND circuit 220 is a two-input AND, energized by output R′ of flip-flop circuit 200 and a matrix row common to selection matrices 128, 130 and 132, while AND circuit 222 is a two-input AND energized by output R′ of flip-flop circuit 202 and a matrix row common to selection matrices 128, 130 and 132. The local counter count at which the first split signal, designated $\phi 2$, occurs is preferably less than the count at which the respectively selected second split signal, designated $\phi 3$, occurs.

In operation, assume the local counter count has just reached 98. At this time, local counter decimal twos stage 106 output terminal 8 is energized, quinary tens stage 110 output terminal 40 is energized and binary fifties stage 114 output terminal 50 is energized, causing AND circuit 208 to produce energization of output L′ of flip-flop circuit 200 and output L′ of flip-flop circuit 202. Assuming the local controller is a three-phase controller, AND circuits 210 and 218 each have two out of three inputs energized.

Assuming first that split 1 is the desired operating split, the fourth inputs to AND circuits 204 and 206 remain deenergized. Hence, the next step of local counter 102, count 100 or 00, energizes only the first three inputs to AND circuits 204 and 206. No output signal is thereby provided from either of these AND circuits, keeping output L′ of flip-flop circuits 200 and 202 energized. As local counter 102 continues to step, it eventually reaches the preselected count designated $\phi 2$ split 1. At this point, the third input to AND circuit 210 is energized, producing an output voltage therefrom which is coupled through OR circuit 216 to the local controller, changing the traffic signal from its first, or B phase, to its final, or A phase, if a two phase signal is being operated, or to its C phase if a three phase signal is being operated. As the local counter continues to step, it reaches a preselected higher count at which the third input to AND circuit 218 is energized. At this point, output energy from AND circuit 218 is coupled through OR circuit 224 to the local controller, causing change of phase from the second, or C phase, to the final, or A phase, in the case of a three phase controller only. When the local counter again reaches count 100, or 00, output voltage from permissive period circuitry 134 is again resumed, terminating the final, or A phase, and resuming the first, or B phase. In this fashion, the local controller operates on split 1 only, regardless of whether it is a two phase or three phase controller.

In event it is desired to operate on split 2 rather than split 1, the split 2 input lead to AND circuit 206 is remotely energized. Thus, when local controller 102 reaches count 00, simultaneous energization of all inputs to AND circuit 206 produces an output voltage from the AND circuit to flip-flop circuit 200, energizing output R′ of the flip-flop, removing energy from the second input to AND circuits 210 and 218. However, one input to each of AND circuits 212 and 220 receives energization from flip-flop circuit 200. When the local counter reaches a preselected count, the $\phi 2$ split 2 input lead to AND circuit 212 is energized, producing an output signal from AND circuit 212 through OR circuit 216 to the local controller, thereby changing the traffic signal phase from its B phase to its A or C phase, depending upon whether the controller is of the two phase or three phase type, respectively. As the local counter continues to count, the $\phi 3$ split 2 input lead to AND circuit 220 is energized at a preselected count, and at that instant a signal is coupled from AND circuit 220 through OR circuit 224 to the local controller, in the case of a three phase controller only, causing a change in traffic signal phase from the C phase to the A phase. Again, the existing phase is terminated and the B phase resumed at count 100 or 00 of the local controller by resumption of the output signal from permissive period circuitry 134 of FIG. 1.

In similar fashion, split 3 may be remotely selected by energization of the split 3 input lead to AND circuit 204. At count 00, AND circuit 204 thereby provides an output signal which causes flip-flop 202 to provide energy at its R′ output, thereby energizing one input lead to each of AND circuits 214 and 222. Subsequently, in a manner similar to that already described, when the local counter reaches the preselected count which energizes the $\phi 2$ split 3 input lead to AND circuit 214, an output signal is coupled from the AND circuit through OR circuit 216 to the local controller, initiating a traffic signal change from phase B to phase A at that time, in the case of a two phase controller, or from phase B to phase C in the case of a three phase controller. Similarly, in the case of a three phase controller only, when the $\phi 3$ split 3 input lead to AND circuit 222 is energized, output energy is coupled from AND circuit 222 to the local controller through OR circuit 224, initiating a traffic signal change from the C phase to the A phase. Again, at local counter count 00 or 100, permissive period circuitry 134 reinitiates phase B.

DESCRIPTION OF RE-SET SWITCH—FIGURE 7

Figure 7:
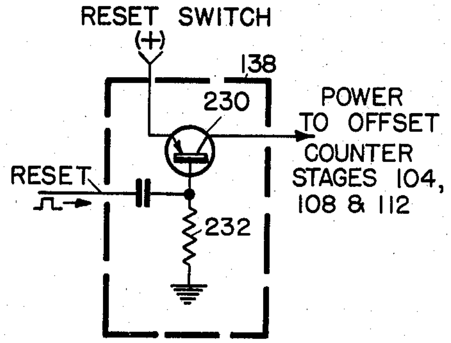
FIG. 7 is a schematic diagram of the reset switch used in the block diagram of FIG. 1.

FIG. 7 is a schematic diagram of reset switch 138, used in the system of FIG. 1. This switch momentarily removes energy from stages 104, 108 and 112 of offset counter 100 in response to an incoming pulse. The circuit comprises a transistor 230 with its emitter coupled to a source of positive potential and its collector coupling energy to each of the offset counter stages. The base of transistor 230 is coupled to ground through a resistor 232. Input pulses are capacitively coupled to the base of the transistor, cutting off power to the offset counter stages for the duration of each input pulse. Hence, each reset pulse capacitively coupled to the base of transistor 230 drives the base positive, since the input or reset pulses are of positive polarity. This momentarily prevents emitter-collector current from flowing through the offset counter stages and destroying the count stored in each stage. Upon completion of the reset pulse, the base of transistor 230 swings in a negative direction, again permitting emitter-collector current to flow. Energy is thereby reapplied to the offset counter stages. At this point, however, no count is present in any of the offset counter stages, and energization of any selected offset bus coupled through selection matrices 122, 124 and 126 of FIG. 1 will thereby cause reinsertion of a number into the offset counter.

DESCRIPTION OF OFF-SET COUNTER SELECTION MATRIX—FIGURE 8

Figure 8:
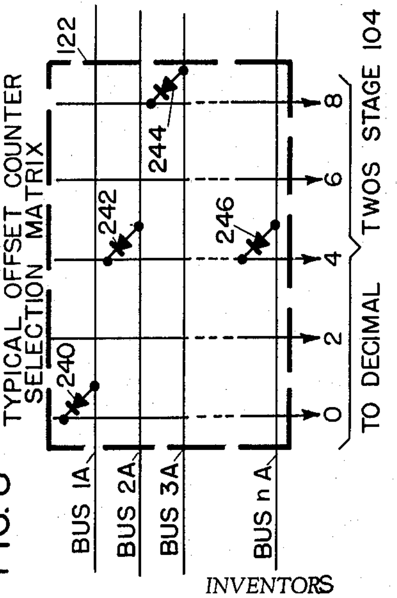
FIG. 8 is a schematic diagram of a typical offset counter selection matrix such as that which may be coupled to offset counter decimal twos stage 104 in the sytem of FIG. 1.

FIG. 8 schematically illustrates a typical offset counter selection matrix, such as those used in the system of FIG. 1. For exemplary purposes only, the matrix shown in FIG. 8 represents matrix 122, since the five columnar conductors are numbered in accordance with the individual stages of the offset counter decimal twos stage. It will be noted that a plurality of conductors comprising the matrix rows, designated bus 1A, bus 2A, bus 3A and so on, up to bus *n*A, are coupled through the selection matrix enabling connections to be made to the rows of adjacent matrices.

A diode 240 is used for coupling the row designated bus 1A to the column designated 0. This diode may be in the form of a diode pin, for easy insertion into a so-called pinboard. Similarly, bus 2A is coupled to column 4 through a diode 242, bus 3A is coupled to column 8 through a diode 244, and bus *n*A is coupled to column 4 through a diode 246. Each bus intermediate buses 3A and *n*A may likewise be coupled to a selected column of the matrix through a diode. Because these diodes are preferably in the form of pins, they are easily removed and reinserted in another location, thereby changing output of the matrix. This can readily be accomplished at each local controller location by maintenance personnel.

To change count in the offset counter, any one of buses 1A–*n*A is energized in accordance with the selected offset signal. This energy is coupled through the diode connected thereto to the selected column, for applying a new count to the offset counter stage coupled to the matrix, the stage in this instance being decimal twos stage 104 in FIG. 8.

DESCRIPTION OF LOCAL COUNTER MATRIX SELECTION—FIGURE 9

Figure 9:
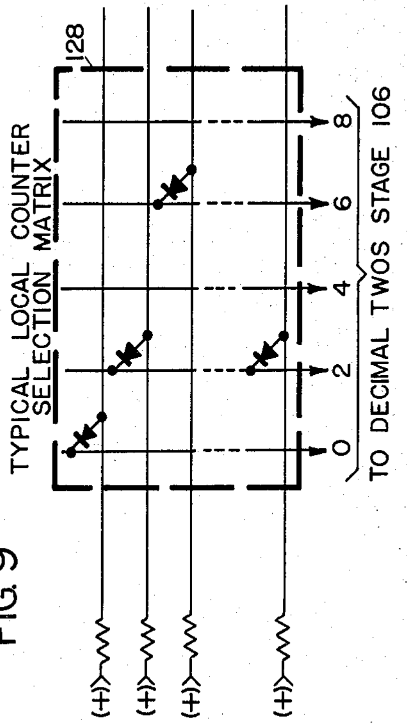
FIG. 9 is a schematic diagram of a typical local counter selection matrix such as that which man be coupled to local counter decimal twos stage 106 in the system of FIG. 1.

FIG. 9 schematically illustrates a typical local counter selection matrix such as matrix 128 of FIG. 1. Diode coupling between rows and columns is used here, as with the matrix of FIG. 8. However, only the diodes coupled to the column in the matrix which is energized from the local counter are rendered nonconductive. The remaining diodes in the matrix are maintained conductive, since each matrix row steadily receives positive energy through a separate resistor. Moreover, in the matrices coupled to the local counter, each row is also diode-coupled to each separate stage of the local counter through a separate diode. Hence, positive bus potential remains at a low amplitude until all diodes coupled to the bus become non-conductive due to an increase in positive voltage applied to the diode cathodes. At this instant, positive bus potential increases. This increased voltage is then utilized in permissive period circuitry 134 and split circuitry 136 in the system of FIG. 1.

DESCRIPTION OF COINCIDENCE DETECTOR—FIGURE 10

Figure 10:
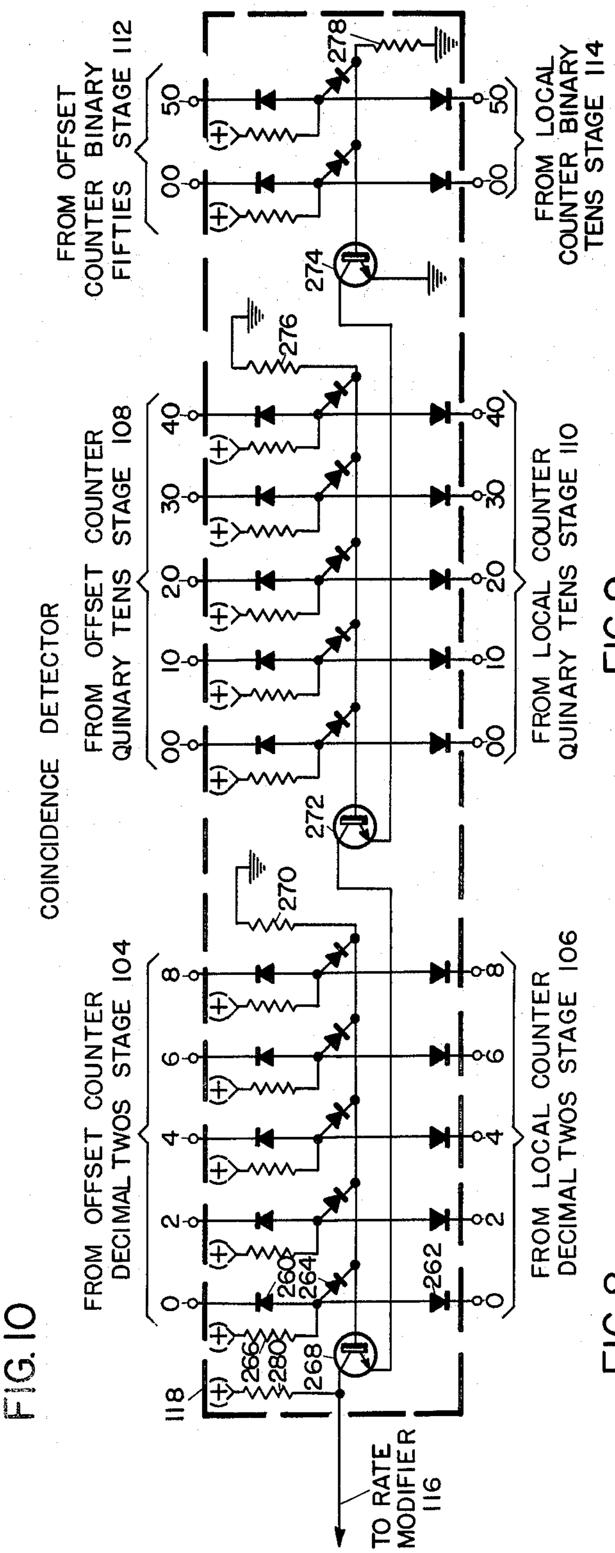
FIG. 10 is a schematic diagram of the coincidence detector used in the system of FIG. 1.

FIG. 10 is a schematic diagram of a preferred embodiment of coincidence detector 118, used in collator 139 of FIG. 1. The coincidence detector comprises a trio of diodes for each individual stage of each counter stage. The anodes of each diode trio receive positive bias through a common bias resistor. The cathode of one of the diodes is coupled to an output terminal of one of the offset counter stages, while the cathode of a second diode in the trio is coupled to the correspondingly numbered output terminal of the corresponding stage of the local counter. The cathode of the third diode comprising the trio is coupled to a common bus. For example, output terminal 0 of decimal twos stage 104 is coupled to the cathode of a diode 260, while output terminal 0 of local counter decimal twos stage 106 is coupled to the cathode of a diode 262. Positive bias is applied to the anodes of diode 260 and 262, as well as to the anode of a diode 264 through a bias resistor 266. The cathode of diode 264 is coupled to the base of transistor 268 which in turn is coupled to ground through a resistor 270. In similar fashion, diodes are coupled from output terminals 2, 4, 6 and 8 of both decimal twos stages 104 and 106 with the anodes of each pair of diodes coupled to correspondingly numbered stage terminals positively biased. Moreover each pair of commoned diode anodes is coupled to the base of transistor 268 through a third diode functioning in a manner similar to diode 264. Identical circuitry is used for coupling correspondingly numbered output terminals from quinary tens stages 108 and 110 to a transistor 272 and correspondingly numbered output terminals from binary fifties stages 112 and 114 to the base of a transistor 274. The base of transistor 272 is coupled to ground through a resistor 276, while the base of transistor 274 is coupled to ground through a resistor 278. The emitter of transistor 274 is grounded. The emitter of transistor 272 is coupled to the collector of transistor 274 and similarly the emitter of transistor 268 is coupled to the collector of transistor 272. Output voltage from coincidence detector 118 is provided to rate modifier 116 of FIG. 1 from the collector of transistor 268, which is positively biased through a resistor 280.

Those skilled in the art will recognize that each trio of diodes, such as diodes 260, 262 and 264, in conjunction with bias resistors, such as resistors 266 and 270, form a two-input AND circuit. For example, whenever a counter stage registers a number, its correspondingly numbered output terminal is positively energized, while its remaining output terminals are held at ground potential. Hence assuming no count is registered in either decimal twos stage, current flows through resistor 266 to output terminal 0 of decimal twos stage 104 in the forward direction through diode 260 and to output terminal 0 of decimal twos stage 106 in the forward direction through diode 262. The voltage drop across resistor 266 is thus relatively large, causing low positive voltage to be applied to the anode of diode 264, preventing forward conduction therethrough. The base of transistor 268 is thereby held substantially at ground potential, retaining the transistor at cutoff. Hence, a large positive potential is applied to the relaxation oscillator of rate modifier 116 in FIG. 1 through resistor 280, thereby permitting the relaxation oscillator to operate.

In event local counter decimal twos stage 106 registers 0, while offset counter decimal twos stage 104 registers some other number, current flows through resistor 266 and diode 260 in the forward direction to the 0 output terminal of decimal twos stage 104, thereby still holding the anode of diode 264 at a sufficiently low potential to prevent conduction therethrough, thus retaining transistor 268 at cutoff. If, however, both decimal twos stages register 0 simultaneously, the cathodes of both diodes 260 and 262 are positively biased, thereby drawing no current through resistor 266. Hence, the anode of diode 264 is positively biased, coupling current through resistor 270 to ground. This biases the base of transistor 268 positively, and if transistors 272 and 274 are conductive, the emitter of transistor 268 is positively biased. Under these conditions, transistor 268 becomes conductive, drawing current through resistor 280, thereby lowering the potential applied to the relaxation oscillator of the rate modifier 116 of FIG. 1. Operation of the relaxation oscillator is thereby halted.

Since transistors 272 and 274 must be conductive as a condition precedent to conduction of transistor 268, it is obvious that the number registered in both quinary tens stages must be identical in order to retain transistor 272 in conduction, while the number registered in both binary fifties stages must be identical in order to retain transistor 274 conductive. This is true since the base of transistor 272 is responsive to the output of both quinary tens stages, while the base of transistor 274 is responsive to the output of both binary fifties stages.

DESCRIPTION OF BLOCK DIAGRAM OF COMPARATOR—FIGURE 11

Figure 11:
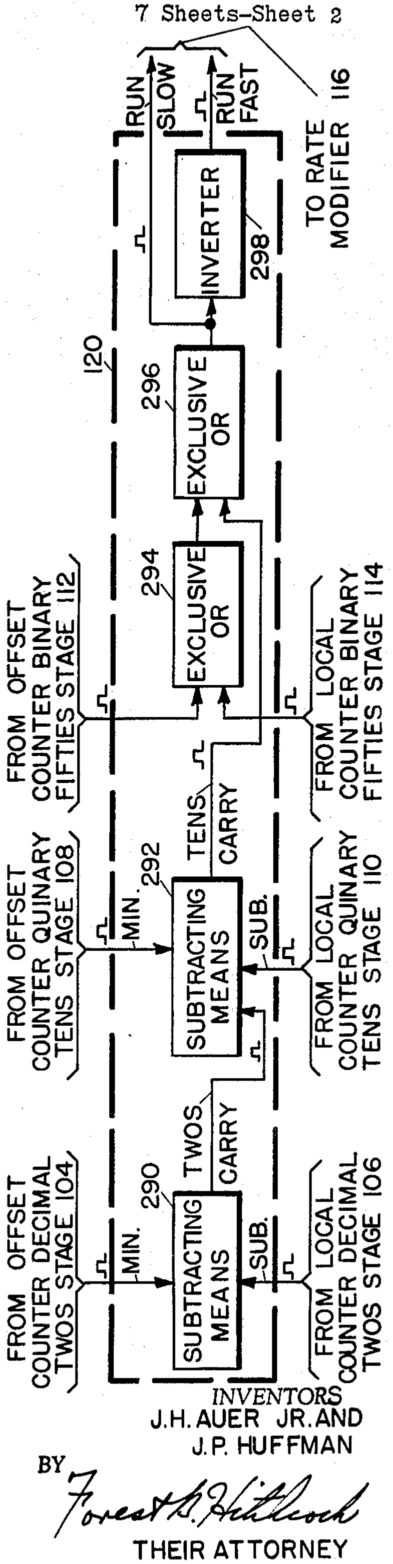
FIG. 11 is a block diagram of the comparator circuit used in the system of FIG. 1.

FIG. 11 is a block diagram of comparator 120, used in collator 139 of FIG. 1. The comparator receives inputs from each of the offset and local counter stages, with the exception of voltages on the 0 and 00 terminals of these stages. Outputs from the decimal twos stages are coupled to a subtracting circuit which provides an output voltage responsive to a carry resulting whenever the subtrahend is greater than the minuend. In event the subtrahend is less than or equal to the minuend, no carry voltage is provided. Similarly, outputs from both counter quinary tens stages are coupled to a subtracting circuit which provides an output voltage representing a carry signal whenever the subtrahend exceeds the minuend. Outputs from the binary fifties stages are applied to an EXCLUSIVE OR circuit.

More specifically, positive output voltage from offset counter decimal twos stage 104 provides a minuend to subtracting means 290, while positive output voltage from local counter decimal twos stage 106 provides a subtrahend to subtracting means 290. Similarly, positive output voltage from offset counter quinary tens stage 108 provides a minuend to subtracting means 292, while positive output voltage from local counter quinary tens stage 110 provides a subtrahend to subtracting means 292. Minuend inputs to subtracting means 290 and 292 comprising the lower half of the maximum possible counts in the offset counter are designated MIN., while subtrahend inputs to subtracting means 290 and 292 comprising the lower half of the maximum possible counts in the local counter are designated SUB. Positive output voltage from terminal 50 of offset counter binary fifties stage 112 comprising the upper half of the maximum possible counts in the offset counter is applied to a first input of EXCLUSIVE OR circuit 294, while positive output voltage from terminal 50 of local counter binary fifties stage 114 comprising the upper half of the maximum possible counts in the local counter is applied to a second input of EXCLUSIVE OR circuit 294. Since each counter preferably counts to 100, subtracting means 290 and 292 are responsive to counts below 50 in each counter, while EXCLUSIVE OR circuit 294 is responsive to counts at or above 50 in each counter.

In event the subtrahend voltage applied to subtracting means 290 exceeds the minuend voltage applied thereto, a twos carry voltage of positive amplitude equal to that representing a count of 10 at the output of either tens stage is applied to subtracting means 292, wherein it is added to the subtrahend voltage applied thereto. Hence, the total subtrahend voltage applied to subtracting means 292 comprises the sum of the subtrahend voltage applied thereto from local counter quinary tens stage 110 plus the twos carry voltage. In event the total subtrahend voltage applied to subtracting means 292 exceeds the minuend voltage applied thereto, a positive tens carry voltage is provided to a first input of an EXCLUSIVE OR circuit 296. A second input to EXCLUSIVE OR circuit 296 is provided from EXCLUSIVE OR circuit 294, of positive amplitude equal to the tens carry voltage. Hence, in event output terminal 50 of only one of the binary fifties stages is energized, an output voltage is provided to the second input of EXCLUSIVE OR circuit 296. This voltage produces a positive output voltage from EXCLUSIVE OR circuit 296, in absence of a tens carry voltage from subtracting means 292, which constitutes a RUN SLOW signal to rate modifier 116 of FIG. 1. This same signal is applied to a phase inverter 298, which, in response to a positive input signal, produces substantially zero output voltage. Hence, no RUN FAST signal is supplied to rate modifier 116 of FIG. 1.

In event no output voltage is provided from EXCLUSIVE OR circuit 294 while a tens carry voltage is supplied to EXCLUSIVE OR circuit 296, a RUN SLOW signal is applied to rate modifier 166, for reasons previously described. On the other hand, in event an output signal is supplied from EXCLUSIVE OR circuit 294 and a tens carry signal is supplied from subtracting means 292, or no output voltage is supplied from both EXCLUSIVE OR circuit 294 and subtracting means 292, EXCLUSIVE OR circuit 296 produces substantially zero output voltage. Under these conditions, phase inverter 298 supplies a positive output voltage, constituting a RUN FAST signal, to rate modifier 116 of FIG. 1. The RUN SLOW signal is then absent, since it corresponds only to zero output voltage of EXCLUSIVE OR circuit 296.

DESCRIPTION OF CIRCUIT OF COMPARATOR—FIGURE 12

Figure 12:
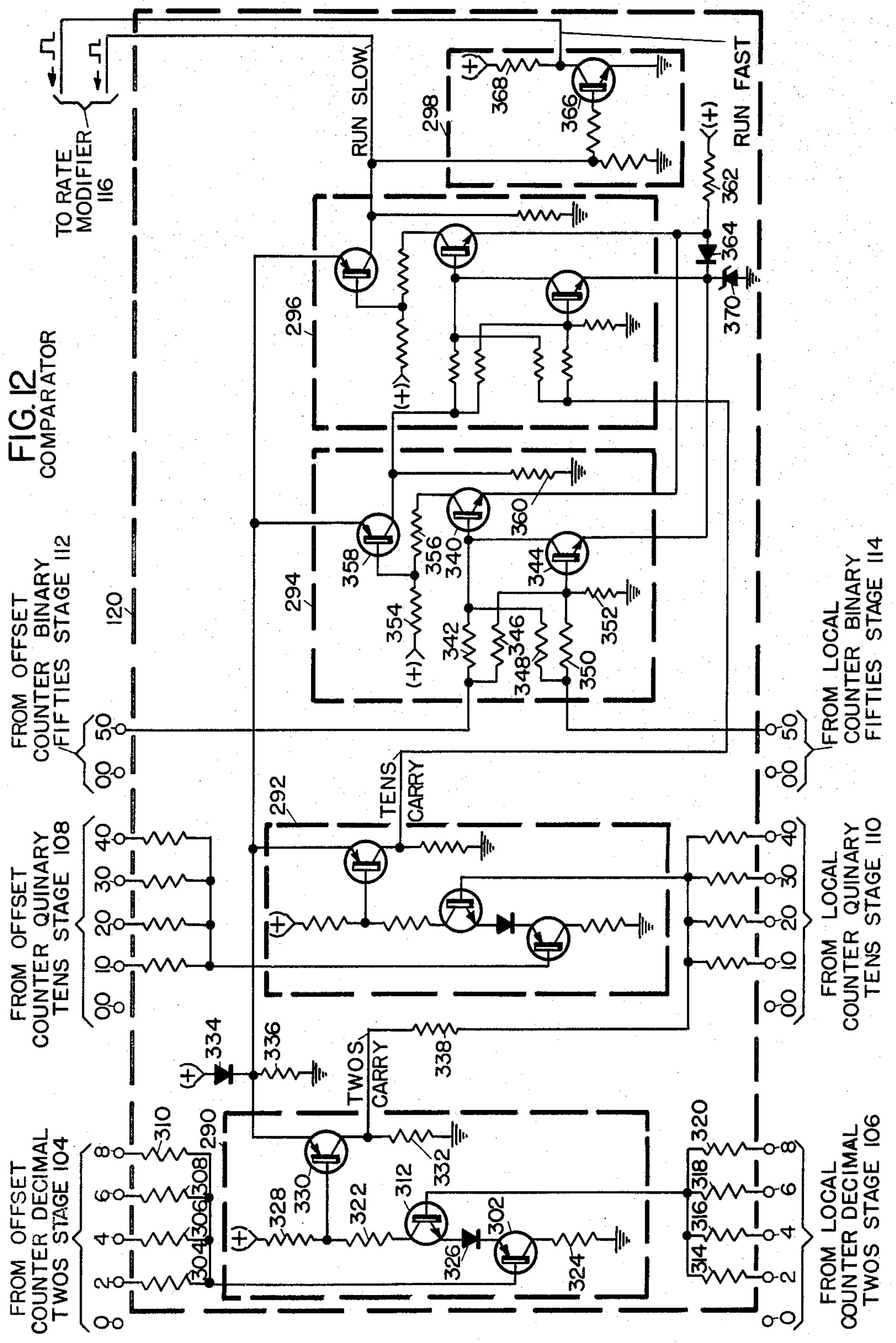
FIG. 12 is a schematic diagram of the comparator circuit used in the system of FIG. 1.

FIG. 12 is a schematic diagram of comparator 120, shown in block form of FIG. 11. Since subtracting means 290 and 292 are identical in circuitry, the portion of the following description pertaining to operation of subtracting means 290 also holds true for subtracting means 292.

Output terminals 2, 4, 6 and 8 of offset counter decimal twos stage 104 are respectively coupled to the base of PNP transistor 302 through resistors 304, 306, 308 and 310. Similarly, output terminals 2, 4, 6 and 8 of local counter decimal twos stage 106 are coupled to the base of an NPN transistor 312 through respective resistors 314, 316, 318 and 320. The amplitude of output voltage from either counter decimal twos stage is a fixed value, regardless of the output terminal on which it appears. However, for proper operation of the subtracting means, the ohmic value of resistor 316 is selected to be one half that of resistor 314, the ohmic value of resistor 318 is selected to be one third that of resistor 314 and the ohmic value of resistor 320 is selected to be one fourth that of resistor 314. Similarly, resistor 304 is chosen to be of the same ohmic value as resistor 314, the ohmic value of resistor 306 is chosen to be the same ohmic value as resistor 316, the ohmic of resistor 308 is chosen to be the same ohmic value as resistor 318 and the ohmic value of resistor 310 is chosen to be the same ohmic value as resistor 320. By so selecting the ohmic values of the resistors coupling the decimal twos stages to subtracting means 290, the amplitude of voltage on the bases of transistors 312 and 302 is made indicative of the count in local counter decimal twos stage 106 and offset counter decimal twos stage 104, respectively. It should be noted that the relative resistance value need not necessarily be in the proportions enumerated; other suitable relative values may be used to achieve similar results, as should be obvious to those skilled in the art.

Positive bias is supplied to the collector of transistor 312 through a collector load resistor 322. The collector of transistor 302 is coupled to ground through a resistor 324. The emitter of transistor 312 is coupled to the diode 326, while the emitter of transistor 302 is coupled to the anode of a diode 326, while the emitter of transistor 302 is coupled to the diode cathode. Positive bias is coupled to load resistor 322 through a bias resistor 328, which also biases the base of a transistor 330 positive. The collector of transistor 330 is coupled to ground through a load resistor 332, while the emitter is positively biased through a forward connected diode 334. The cathode of diode 334 is coupled to ground through a resistor 335. The so-called twos carry voltage is coupled from the collector of transistor 330 through a resistor 338 of ohmic value equal to that of resistors 304 and 314, to the common side of the input resistors coupling energy to subtracting means 292 from local counter quinary tens stage 110. In this fashion, output voltage representing the twos carry adds to the input voltage applied to subtracting means 292 from the local counter quinary tens stage.

In a fashion similar to that described for subtracting means 290, subtracting means 292 provides an output voltage comprising the so-called tens carry which is supplied to the first input of EXCLUSIVE OR circuit 296. The second input to EXCLUSIVE OR circuit 296 is energized by output voltage from EXCLUSIVE OR circuit 294. The first input to EXCLUSIVE OR circuit 294 is coupled to the 50 output terminal of offset counter binary fifties stage 112, while the second input to EXCLUSIVE OR circuit 294 is coupled to the 50 output terminal of local counter binary fifties stage 114. Since EXCLUSIVE OR circuits 294 and 296 are of identical configuration, operation of circuit 294 only is herein described.

Positive output voltage from the 50 terminal of offset counter binary fifties stage 112 is coupled to the base of a transistor 340 through a resistor 342 and to the base of a transistor 344 through a resistor 346. Similarly, voltage from the 50 output terminal of local counter binary fifties stage 114 is coupled to the base of transistor 340 through a resistor 348 and to the base of transistor 344 through a resistor 350. The collector of transistor 344 is coupled to the base of transistor 340, while input signal voltage for the base of transistor 344 is developed across a resistor 352. The collector of transistor 340 receives positive bias voltage through a series-connected bias resistor 354 and collector load resistor 356. The base of an output transistor 358 receives voltage from a point common to resistors 354 and 356, and develops output voltage across a collector load resistor 360. Positive emitter bias is supplied to transistor 358 through diode 334. A slightly positive emitter bias is supplied to the emitter of transistor 340 through a resistor 362. A forward poled diode 364 provides a slightly positive emitter bias to transistor 344 which is of slightly lower amplitude than the positive bias applied to the emitter of transistor 340 by the forward voltage drop across diode 364. Application of these slightly positive biases on the emitters of transistors 340 and 344 permits sharply defined switching of the transistors, since it is thereby possible to drive the bases of the transistors to a voltage of amplitude less than the emitter voltage amplitude. A zener diode 370 is coupled between the cathode of diode 364 and ground in a reverse-bias direction, operating in its broken-down condition. This diode is thereby operated on the substantially constant current portion of its characteristic, permitting the emitter bias on transistors 340 and 344 to remain nearly constant during wide swings of load current in these transistors.

Since the circuitry in both EXCLUSIVE OR circuits is identical, circuit 296 functions identically to circuit 294. Output voltage from circuit 296 provides the RUN SLOW signal to rate modifier 116 of FIG. 1 in the event this output voltage is positive. In event this output voltage is zero, obviously no RUN SLOW signal is applied to the rate modifier. However, the base of a transistor 366, which together with its associated circuitry comprises phase inverter 298, receives this output voltage and consequently is driven positive. The collector of the transistor receives positive bias through a collector load resistor 368, while the emitter is grounded. Output voltage comprising the RUN FAST signal for rate modifier 116 of FIG. 1 is supplied from the collector of transistor 366.

Considering overall operation of comparator 120 of FIG. 12, assume first that the number momentarily stored in local counter decimal twos stage 106 is less than the number momentarily stored in decimal twos stage 104. Under these conditions, positive bias applied to the base of transistor 312 representing the decimal twos subtrahend is of lower amplitude than the positive bias applied to the base of transistor 302 in response to the decimal twos minuend. Transistor 312 operates as an emitter follower, establishing emitter potential for transistor 302. Since the amplitude of positive bias on the base of transistor 302 exceeds the amplitude of positive bias on the base of transistor 312, amplitude of positive bias on the base of transistor 302 exceeds the amplitude of positive bias on the emitter of transistor 302. Therefore, transistor 302 is held at cutoff, providing no current path to ground through the voltage divider formed by resistors 328 and 322 in the collector circuit of transistor 312. Hence, the voltage applied to the base of transistor 330 remains substantially at the amplitude of the bias supply, maintaining transistor 330 at cutoff. The collector of transistor 330 is therefore substantially at ground potential, so that no twos carry signal representing an excess in local counter decimal twos count over offset counter decimal twos count is coupled to the input of subtracting means 292 to add to the voltage supplied to subtracting means 292 from local counter quinary tens stage 110. Similarly, in event input potential to subtracting means 292 from offset counter quinary tens stage 108 exceeds input potential from local counter quinary tens stage 110, no tens carry signal is supplied to EXCLUSIVE OR circuit 296. It is well to note that if the digit momentarily stored in local counter decimal twos stage 106 is identical to the digit momentarily stored in offset counter decimal twos stage 104, base bias amplitudes on transistors 302 and 312 are identical. Under these conditions, base voltage amplitude on transistor 302 exceeds emtter voltage amplitude on transistor 302, maintaining the transistor in its cutoff condition. Diode 326 assures that transistor 302 is at cutoff under these circumstances, by lowering emitter voltage on transistor 302 below emitter voltage on transistor 312 by an amount equal to the forward voltage drop across the diode. This compensates for the situation where input resistors to subtracting means 290 from the local counter decimal twos stage may not be exactly matched to corresponding input resistors from the offset counter decimal twos stage, by assuring that a base voltage on transistor 312 slightly in excess of the base voltage on transistor 302 by an amount less than that produced when the count in local counter decimal twos stage 106 exceeds that in offset counter decimal twos stage by 2 will not trigger transistor 302 into conduction. The function of diode 326, therefore, is to prevent emitter voltage on transistor 302 from exceeding base voltage thereon when the counts in both decimal twos stages are identical.

In event the digit momentarily stored in local counter decimal twos stage 106 is larger than the digit momentarily stored in offset counter stage 104, base bias amplitude on transistor 312 exceeds the base bias amplitude on transistor 302. Under these conditions, positive bias amplitude on the base of transistor 302 is below the positive base bias amplitude on its emitter. This condition turns on transistor 302, thereby providing a current path to ground through resistors 328 and 322. The voltage drop then appearing across resistor 328 drives the base of transistor 330 in a negative direction, causing the transistor to conduct. This produces a voltage drop across resistor 332, thereby supplying a positive twos carry voltage to the input of subtracting means 292 at the side receiving energy from local counter quinary tens stage 110. The ohmic value of coupling resistor 338 is identical to the ohmic value of resistor 314, while collector voltage on transistor 330 when the transistor conducts is identical in amplitude to that of the output voltage provided from any stage of either counter. This assures that the carry voltage supplied to subtracting means 292 is of proper value to add a count of ten to the count supplied to subtracting means 292 from local counter quinary tens stage 110.

As already mentioned, operation of subtracting means 292 is identical to operation of subtracting means 290. Thus in event a tens carry signal is provided from subtracting means 292, the number momentarily sensed in local counter decimanl twos stage 106 plus local counter quinary tens stage 110 is greater than the number momentarily sensed in offset counter decimal twos stage 104 plus offset counter quinary tens stage 108. However, no tens carry signal is present if the number momentarily stored in local counter decimal twos stage 106 plus local counter quinary tens stage 110 is less than or equal to the number momentarily stored in offset counter decimal twos stage 104 plus offset counter quinary tens stage 108. As already mentioned, presence of a tens carry signal provides a first input to EXCLUSIVE OR circuit 296, so that a RUN SLOW signal is produced therefrom in event no output signal is provided from EXCLUSIVE OR circuit 294, while if EXCLUSIVE OR circuit 294 is simultaneously provides an output signal to EXCLUSIVE OR circuit 296, a RUN FAST signal is supplied from the output of inverter 298. On the other hand, during absence of a tens carry signal, presence of an output voltage from EXCLUSIVE OR circuit 294 provides a RUN SLOW signal to rate modifier 116 while no output voltage from EXCLUSIVE OR circuit 294 provides a RUN FAST signal to rate modifier 116.

Consider now operation of EXCLUSIVE OR circuit 294, with the understanding that the circuitry and operation of EXCLUSIVE OR circuit 296 is identical to that of circuit 294. Assume first that neither output terminal 50 of binary fifties stages 112 and 114 is energized. Under these conditions, the bases of NPN transistors 344 and 340 are held substantially at ground potential. Since the emitter of transistor 344 is biased above ground by the drop across zener diode 370 and the emitter of transistor 340 is biased above ground by the drop across zener diode 370 plus the drop across diode 364, both transistors 344 and 340 are held at cutoff. Since substantially no collector current is therefore drawn by transistor 340, the base of PNP transistor 358 is held substantially at the amplitude of the power supply voltage. Positive emitter bias on transistor 358 is below that of the base, since a slight forward voltage drop exists across diode 334. Therefore transistor 358 is held at cutoff, so that output voltage from EXCLUSIVE OR circuit 294 comprising the voltage drop across collector load resistor 360 is substantially zero when neither counter binary fifties stage output terminal 50 is energized.

Assume now that output terminal 50 of local counter binary fifties stage 114 is energized. This provides a positive bias on the base of transistor 344 due to a voltage drop across resistors 350 and 352. However, since resistor 352 is considerably smaller than resistor 350, the positive bias on the base of transistor 344 is below the positive bias on the emitter of transistor 344. Hence, transistor 344 remains at cutoff. However, positive potential equal to the sum of the voltage drop across resistors 342, 346 and 352 is applied to the base of transistor 340. Since resistors 342, 346, 348 and 350 are all selected to be of the same ohmic value, the positive base bias on transistor 340 is not only considerably greater than the positive base bias on transistor 344, but is also considerably greater than the positive emitter bias on transistor 340. Transistor 340 thus conducts, drawing collector current through resistors 354 and 356. The resulting voltage drop across resistor 354 lowers the base bias on transistor 358, driving the transistor into conduction. Collector current for transistor 358 then flows through resistor 360, providing a positive input signal to EXCLUSIVE OR circuit 296 from EXCLUSIVE OR circuit 294.

If a voltage is provided at output terminal 50 of offset counter binary fifties stage 112 rather than at output terminal 50 of local counter binary fifties stage 114, again it will be recognized that transistor 344 remains at cutoff and transistor 340 becomes conductive, thereby providing a positive input signal to EXCLUSIVE OR circuit 296. This is because the circuit from output terminal 50 of offset counter binary fifties stage 112 to transistors 334 and 340 is identical to the circuit from output terminal 50 of local counter binary fifties stage 114 to transistors 344 and 340. Hence, EXCLUSIVE OR circuit 294 functions in exactly the same manner regardless of which input thereto is energized.

However, if output terminal 50 at both binary fifties stages is energized, both inputs to EXCLUSIVE OR circuit 294 are energized. Under these conditions, current flow through resistor 352 and resulting voltage drop across the resistor are substantially double that when only one input to EXCLUSIVE OR circuit 294 is energized, since current is now supplied both from offset binary fifties stage 112 through resistor 346 and from local counter binary fifties stage 114 through resistor 350, to resistor 352. Under these conditions, positive base bias on transistor 344 exceeds the positive emitter bias, driving the transistor into conduction, thereby clamping the base of transistor 340 to a voltage equal to the drop across zener diode 370 plus the collector-emitter drop across transistor 344. Since the collector-emitter drop across transistor 344 is less than the forward drop across diode 364, the positive base bias on transistor 340 is maintained at a potential below the positive emitter bias thereon, thus maintaining the transistor at cutoff. Hence, no collector current flows through resistors 354 and 356, thereby maintaining the base bias on transistor 358 at substantially the amplitude of the power supply voltage. No input voltage is supplied to EXCLUSIVE OR circuit 296 from EXCLUSIVE OR circuit 294 under these conditions.

EXCLUSIVE OR circuit 296 operates in exactly the same manner as that described for EXCLUSIVE OR circuit 294. Hence, when one and only one input to EXCLUSIVE OR circuit 296 is energized, a positive RUN SLOW signal is provided to rate modifier 116 of FIG. 1. This positive signal is also applied to the base of transistor 366, causing it to conduct and draw collector current through resistor 368, making output voltage from inverter 298 substantially zero. No RUN FAST signal is thereupon supplied to rate modifier 116 of FIG. 1. On the other hand, if both or neither inputs to EXCLUSIVE OR circuit 296 are energized, output voltage from EXCLU- SIVE OR circuit 296 is substantially zero. No RUN SLOW signal is thereupon supplied to rate modifier 116 of FIG. 1. Under these conditions, the base of transistor 366 is biased at ground, driving the transistor into cutoff. Substantially no collector current then flows through resistor 368, causing application of a positive RUN FAST signal to rate modifier 116 from phase inverter 298.

Thus there has been shown a system for changing traffic signal offsets in response to a command from a master controller in a smooth, yet expeditious manner, with minimum traffic disruption. The system includes novel comparator means responsive to the counts in each of two counters, whereby one of two output signals is provided in response to an out-of-correspondence condition of the counters, depending upon whether the local or slave counter is to run at an increased or decreased rate in order to most expeditiously be resynchronized with the master counter. The comparator circuit includes a simplified EXCLUSIVE OR circuit requiring but a minimum of circuit elements for operation under output signal or no output signal conditions. Moreover, the system for changing traffic signal offsets further includes a novel pulse rate modifier circuit wherein pulses may be added to or removed from a pulse train in response to either one of two applied signals, without unwanted interference with the pulses in the train.

Although but one embodiment of the present invention has been described, it is to be specifically understood that this form is selected to facilitate in disclosure of the invention rather than to limit the number of forms which it may assume; various modifications and adaptations may be applied to the specific form shown to meet requirements of practice, without in any manner departing from the spirit or scope of the invention.

What is claimed is:

1. A traffic signal control system comprising first and second digital counters each having an input terminal, means coupling a pulse train to the input of the first counter enabling the counter to count in synchronism with the repetition rate of the applied pulses, pulse rate modifying means coupling the pulse train to the input of the second counter, means continuously collating counts in the first counter with counts in the second counter and providing control signals to the rate modifying means in response to the collation, said rate modifying means increasing or decreasing the number of pulses applied to said counter at a substantially constant rate in response to the control signals when asynchronism between counters is detected, and circuit means providing an output signal from the second counter when the count therein reaches a predetermined value for controlling the change of signal indications displayed by an associated traffic signal.

2. The traffic signal control system of claim 1 wherein said means continuously collating counts in the first counter with counts in the second counter comprises a coincidence detector coupled to the first and second counters for rendering the rate modifying means operative when the first and second counters operate in asynchronism, and a comparator responsive to instantaneous counts in the first and second counters for determining whether the rate modifying means should increase or decrease the number of pulses in said pulse train in order to expeditiously resynchronize the counters, said comparator supplying a signal to the rate modifying means selected in accordance with the determination.

3. The traffic signal control system of claim 2 wherein each said counter has a predetermined maximum counting capacity and said comparator comprises subtracting means responsive to counts below one half of the maximum possible counts in each counter, a first two-input EXCLUSIVE OR circuit having one input responsive to counts above one half of the maximum possible counts in the first counter and the other input responsive to counts above one half of the maximum possible counts in the second counter, a second two-input EXCLUSIVE OR circuit having one input responsive to output voltage from the first EXCLUSIVE OR circuit and the other input responsive to a carry signal indicative of a remainder from the subtracting means, said second EXCLUSIVE OR circuit providing a signal to the rate modifying means for decreasing the number of pulses in said pulse train when one and only one input coupled thereto is energized, and phase inverter means responsive to the second EXCLUSIVE OR circuit and providing a signal to said rate modifying means for increasing the number of pulses in said pulse train only in absence of an output voltage from the second EXCLUSIVE OR circuit.

4. The traffic signal control system of claim 2 wherein said rate modifying means includes an oscillator energized from said coincidence detector, means storing each output pulse produced by the oscillator, a three-input AND circuit, having one input coupled to the storing means, means delaying each pulse in said pulse train, said delaying means providing a second input to the AND circuit, a third input to the AND circuit energized from said comparator upon the determination that said rate modifying means should decrease the number of pulses in said pulse train, a two-input AND circuit, a flip-flop circuit responsive to output pulses from said three-input AND circuit and energizing one input of the two-input AND circuit until initiation of oscillator output pulses and subsequent to each even pulse from said oscillator until the next-occurring odd pulse is provided, means responsive to output of the flip-flop circuit for resetting said storing means, means coupling said pulse train to the other input of the two-input AND circuit, and means coupling output pulses from the two-input AND circuit to said second counter.

5. The traffic signal control system of claim 4 wherein said delaying means includes a monostable multivibrator triggered by each pulse of said pulse train, and means differentiating each output pulse of said multivibrator and coupling the differentiated pulses to said second input of the three-input AND circuit.

6. A traffic signal control system comprising first and second counters each having an input, switching means for abruptly setting a predetermined count into the first counter, said first counter counting the pulses in a received pulse train, a rate modifier responsive to said pulse train and coupled to the input of the second counter, coincidence detector means responsive to the count in the first and second counters and energizing the rate modifier whenever asynchronism between the first and second counters is detected, said rate modifier coupling said pulse train directly to the second counter in absence of a signal from the coincidence detector means, and comparator means responsive to the count in the first and second counters selectively providing one of two output signals to the rate modifier in accordance with whether the count in the second counter leads or lags the count in the first counter by more or less than fifty percent of counter capacity, said rate modifier introducing or removing pulses from said pulse train at a substantially fixed pulse repetition rate in response to the selectively provided comparator means output signal and presence of a signal from the coincidence detector means, thereby bringing the second counter into synchronism with the first counter at a substantially constant rate.

7. A comparator circuit for comparing counts in first and second decimal-biquinary counters wherein the second counter is to be synchronized with the first counter comprising subtracting means responsive to counts below one half of the maximum possible counts in each counter, a first two-input EXCLUSIVE OR circuit having one input responsive to counts above one half of the maximum possible counts in the first counter and the other input responsive to counts above one half of the maximum possible counts in the second counter, a second two-input EXCLUSIVE OR circuit having one input responsive to output voltage from the first EXCLUSIVE OR circuit and the other input responsive to a carry signal indicative of a remainder from the subtracting means, said second EXCLUSIVE OR circuit providing a signal for initiating a decrease in the counting rate of the second counter when one and only one input coupled thereto is energized, and phase inverter means responsive to the second EXCLUSIVE OR circuit and providing a signal for initiating an increase in the counting rate of the second counter only in absence of an output voltage from the second EXCLUSIVE OR circuit.

8. An EXCLUSIVE OR circuit comprising first and second transistors, each transistor having a base, a collector and an emitter, circuit means coupling a first input signal to the bases of the first and second transistors, circuit means coupling a second input signal to the bases of the first and second transistors, first current impedance means coupling the base of the first transistor to ground, means biasing the emitter of the first transistor, means biasing the emitter of the second transistor at a potential greater than the emitter bias on the first transistor, means coupling the collector of the first transistor to the base of the second transistor, second current impedance means coupling a source of voltage to the collector of the second transistor, and output means responsive to voltage developed across a portion of the second current impedance means.

9. The EXCLUSIVE OR circuit of claim 8 wherein the first current impedance means comprises first resistor means and the second current impedance means comprises second resistor means.

10. The EXCLUSIVE OR circuit of claim 8 wherein said output means responsive to voltage developed across a portion of the second current impedance means comprises a third transistor having a base, a collector and an emitter, means coupling the base of said third transistor to a point on said second current impedance means, means coupling the collector of said third transistor to a load impedance, means coupling a bias potential to the emitter of said third transistor, and utilization means responsive to voltage across said collector load impedance.

11. The EXCLUSIVE OR circuit of claim 10 wherein each said impedance means comprises resistor means.

12. A traffic signal control system comprising first and second digital counters, each having an input, means coupling a pulse train to the input of the first counter causing the counter to count in synchronism with the repetition rate of the applied pulse train, a pulse rate modifier coupling the pulse train to the input of the second counter, selection means for instantaneously inserting a new count into the first counter, means continually collating counts in the first counter with counts in the second counter and providing control signals to the rate modifier in accordance with the collation, said rate modifier increasing or decreasing the number of pulses in the pulse train at a substantially constant rate in response to the control signals when the first counter is in asynchronism with the second counter, and circuit means providing output signals from the second counter when the count therein reaches a predetermined value for controlling the change of signal indications displayed by an associated signal.

13. A control system for a traffic signal controlling the flow of traffic at an intersection comprising a signal controller including first and second digital counter means each having an input, means coupling a pulse train to the inputs of the first and second counter means enabling both said counter means to count in synchronism with the repetition rate of the applied pulse train, switching means for at times discontinuously altering the instantaneous count in said first counter means, means responsive to said count alteration for resynchronizing the second counter means to the first counter means by driving the count in said second counter means toward the count in said first counter means at a substantially constant rate, and means responsive to the attainment by said second counter means of respectively different counts for controlling the change of signal indications displayed by the associated traffic signal.

14. A traffic signal control system comprising first and second counter means each having an input, means coupling a pulse train to the input of the first counter means enabling said first counter means to count at a rate proportional to the repetition rate of the applied pulse train, switching means for discontinuously altering the instantaneous count in the first counter means, pulse rate modifying means, said second counter means receiving input pulses from said pulse rate modifying means, said pulse rate modifying means being responsive to the count in each of the first and second counter means for selectively altering the pulses applied to the input of said second counter means only when the first and second counters are in asynchronism.

15. In a system for the control from a control office of a plurality of traffic signals respectively controlling traffic at a plurality of intersections the combination comprising, controller means for each intersection for controlling the signal indications sequentially displayed to the different directions of traffic, control office means operatively connected to each said controller means via at least one communication circuit for transmitting to each controller means repetitive cycles each comprising a predetermined number of discrete signals, each said controller means including first digital counting means for counting said discrete signals, control office means operatively connected to each said controller means for at times abruptly changing the counts registered by the first digital counting means for the different controller means to thereby establish a predetermined phase relationship among the corresponding plurality of first digital counting means, each said controller means also including second digital counting means and means continuously responsive to both said first and second digital counting means and continually producing manifestations indicative of both the magnitude and the sign of the difference in digital counts registered concurrently by said first and second digital counting means, means controlled by said responsive means for controlling the application of pulses to said second digital counting means to reduce said difference in counts to zero, and signal operating means included in said controller means and responsive to the attainment by said second counting means of respectively different counts for controlling the change of signal indications displayed by the respective traffic signals.

16. The system of claim 15 in which said responsive means controls the application of said discrete signals directly to said second counting means when the difference in counts registered by said first and second counting means is zero but alters the rate at which discrete signals are applied to said second digital counting means when said difference is other than zero in accordance with said manifestations indicative of the magnitude and sign of the difference.

References Cited by the Examiner

UNITED STATES PATENTS 2,897,363 7/1959 Gorges ______________ 328—48

NEIL C. READ, *Primary Examiner.*

THOMAS B. HABECKER, *Examiner.*